US012763834B2

(12) United States Patent
Ganguly et al.

(10) Patent No.: US 12,763,834 B2
(45) Date of Patent: Oct. 13, 2026

(54) CHANNEL STATE INFORMATION REFERENCE SIGNALS FOR WIRELESS COMMUNICATIONS

(71) Applicant: Samsung Electronics Co., Ltd., Suwon-si (KR)

(72) Inventors: Shouvik Ganguly, Frisco, TX (US); Young Han Nam, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/402,441

(22) Filed: Jan. 2, 2024

(65) Prior Publication Data

US 2024/0322879 A1 Sep. 26, 2024

Related U.S. Application Data

(60) Provisional application No. 63/599,129, filed on Nov. 15, 2023, provisional application No. 63/448,563, filed on Feb. 27, 2023.

(51) Int. Cl.
*H04B 7/06* (2006.01)
*H04B 17/318* (2015.01)

(52) U.S. Cl.
CPC ......... *H04B 7/0626* (2013.01); *H04B 7/0632* (2013.01); *H04B 17/328* (2023.05)

(58) Field of Classification Search
CPC ........................... H04B 7/0626; H04B 17/328; H04B 7/06323; H04B 7/0632
See application file for complete search history.

(56) References Cited

U.S. PATENT DOCUMENTS

2020/0382190 A1 12/2020 Pawar et al.
2021/0127360 A1 4/2021 Noh
2025/0317938 A1* 10/2025 Haghighat ........... H04L 5/0026

FOREIGN PATENT DOCUMENTS

EP 4266614 A1 10/2023
KR 102415630 B1 6/2022
(Continued)

OTHER PUBLICATIONS

International Search Report and Written Opinion issued Jun. 3, 2024 regarding International Application No. PCT/KR2024/002508, 6 pages.
(Continued)

*Primary Examiner* — James P Duffy

(57) ABSTRACT

Methods and apparatuses for channel state information reference signal in wireless communication systems are provided. The methods of BS comprise: identifying first information corresponding to a number of antenna ports associated with transmissions of CSI-RSs; identifying, a first size of CDM groups associated with the number of antenna ports and a first shape of the CDM groups; identifying second information from the first information; identifying a starting SC index and a starting symbol index; identifying, based on the number of antenna ports associated with a CSI-RS transmission and a predetermined frequency domain granularity of channel state information, a size of RB cluster for the resource allocation; and transmitting, to a UE, resource configuration information indicating at least one of the size of RB cluster, the first size of the CDM groups, the first shape of the CDM groups, the starting SC index, and the starting symbol index.

20 Claims, 29 Drawing Sheets

(56) References Cited

FOREIGN PATENT DOCUMENTS

| | | |
|---|---|---|
| WO | 2022094972 A1 | 5/2022 |
| WO | 2022131817 A1 | 6/2022 |

OTHER PUBLICATIONS

Garcia et al., "A Tutorial on 5G NR V2X Communications", IEEE Communications Surveys & Tutorials, vol. 23, No. 3, Feb. 2021, pp. 1972-2026.

"5G; NR; Physical channels and modulation (3GPP TS 38.211 version 17.4.0 Release 17)", ETSI TS 138 211 V17.4.0, Jan. 2023, 141 pages.

"5G; NR; Multiplexing and channel coding (3GPP TS 38.212 version 17.4.0 Release 17)", ETSI TS 138 212 V17.4.0, Jan. 2023, 206 pages.

"5G; NR; Physical layer procedures for control (3GPP TS 38.213 version 17.4.0 Release 17)", ETSI TS 138 213 V17.4.0, Jan. 2023, 263 pages.

"5G; NR; Physical layer procedures for data (3GPP TS 38.214 version 17.4.0 Release 17)", ETSI TS 138 214 V17.4.0, Jan. 2023, 236 pages.

"5G; NR; Medium Access Control (MAC) protocol specification (3GPP TS 38.321 version 17.3.0 Release 17)", ETSI TS 138 321 V17.3.0, Jan. 2023, 254 pages.

"5G; NR; Radio Resource Control (RRC); Protocol specification (3GPP TS 38.331 version 17.3.0 Release 17)", ETSI TS 138 331 V17.3.0, Jan. 2023, 1295 pages.

Supplementary European Search Report dated Apr. 10, 2026, in connection with European Patent Application No. 24764168, 9 pages.

* cited by examiner

CHANNEL STATE INFORMATION REFERENCE SIGNALS FOR WIRELESS COMMUNICATIONS

CROSS-REFERENCE TO RELATED APPLICATIONS AND CLAIM OF PRIORITY

The present application claims priority to U.S. Provisional Patent Application No. 63/448,563, filed on Feb. 27, 2023 and U.S. Provisional Patent Application No. 63/599,129, filed on Nov. 15, 2023. The contents of the above-identified patent documents are incorporated herein by reference.

TECHNICAL FIELD

The present disclosure relates generally to wireless communication systems and, more specifically, the present disclosure relates to design of channel state information reference signals (CSI-RSs) in wireless communication systems.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

The present disclosure relates to wireless communication systems and, more specifically, the present disclosure relates to CSI-RSs in wireless communication systems.

In one embodiment, a base station (BS) in a wireless communication system is provided. The BS comprises a processor configured to: identify first information corresponding to a number of antenna ports associated with transmissions of CSI-RSs; identify, based on channel coherence information, a first size of code division multiplexing (CDM) groups associated with the number of antenna ports and a first shape of the CDM groups; identify, based on the first size and the first shape of the CDM groups, second information from the first information; identify, based on the second information, a starting subcarrier (SC) index and a starting symbol index for a resource allocation; identify, based on the number of antenna ports associated with a CSI-RS transmission and a predetermined frequency domain granularity of channel state information, a size of resource block (RB) cluster for the resource allocation. The BS further comprises a transceiver operably coupled to the processor, the transceiver configured to transmit, to a user equipment (UE), resource configuration information indicating at least one of the size of RB cluster, the first size of the CDM groups, the first shape of the CDM groups, the starting SC index, and the starting symbol index.

In another embodiment, a method of a BS in a wireless communication system is provided. The method comprises: identifying first information corresponding to a number of antenna ports associated with transmissions of CSI-RSs; identifying, based on channel coherence information, a first size of CDM groups associated with the number of antenna ports and a first shape of the CDM groups; identifying, based on the first size and the first shape of the CDM groups, second information from the first information; identifying, based on the second information, a starting SC index and a starting symbol index for a resource allocation; identifying, based on the number of antenna ports associated with a CSI-RS transmission and a predetermined frequency domain granularity of channel state information, a size of RB cluster for the resource allocation; and transmitting, to a UE, resource configuration information indicating at least one of the size of RB cluster, the first size of the CDM groups, the first shape of the CDM groups, the starting SC index, and the starting symbol index.

In yet another embodiment, a UE in a wireless communication system is provided. The UE comprises a transceiver configured to receive, from a BS, resource configuration information indicating at least one of a size of RB cluster, a first size of CDM groups, a first shape of the CDM groups, a starting SC index, and a starting symbol index. The UE further comprises a processor operably coupled to the transceiver, the processor configured to: identify the size of RB cluster for a resource allocation, the size of RB cluster is associated with a number of antenna ports for a CSI-RS transmission and a predetermined frequency domain granularity of channel state information; identify the first size of CDM groups associated with the number of antenna ports and the first shape of the CDM groups, wherein the first size of CDM groups is determined in accordance with channel coherence information, and identify the starting SC index and the starting symbol index for the resource allocation, wherein: the number of antenna ports associated with transmissions of CSI-RSs corresponds to first information and second information is identified from the first information based on the first size and the first shape of the CDM groups, and the starting SC index and the starting symbol index are determined based on the second information.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C"

includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIG. 1 through FIG. 31, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive MIMO, full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancelation and the like.

The discussion of 5G systems and frequency bands associated therewith is for reference as certain embodiments of the present disclosure may be implemented in 5G systems. However, the present disclosure is not limited to 5G systems, or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Figure 1:
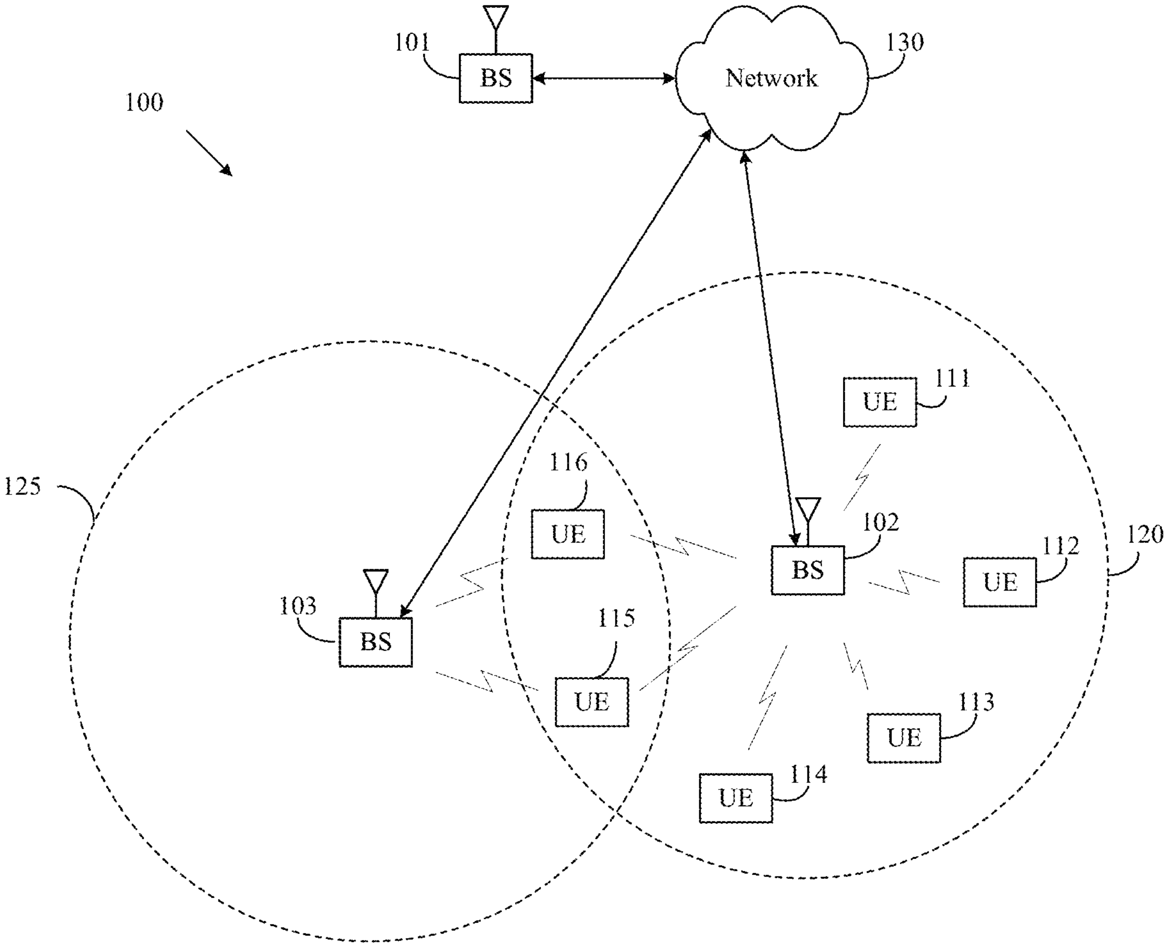
FIG. 1 illustrates an example of wireless network according to various embodiments of the present disclosure.
Figure 2:
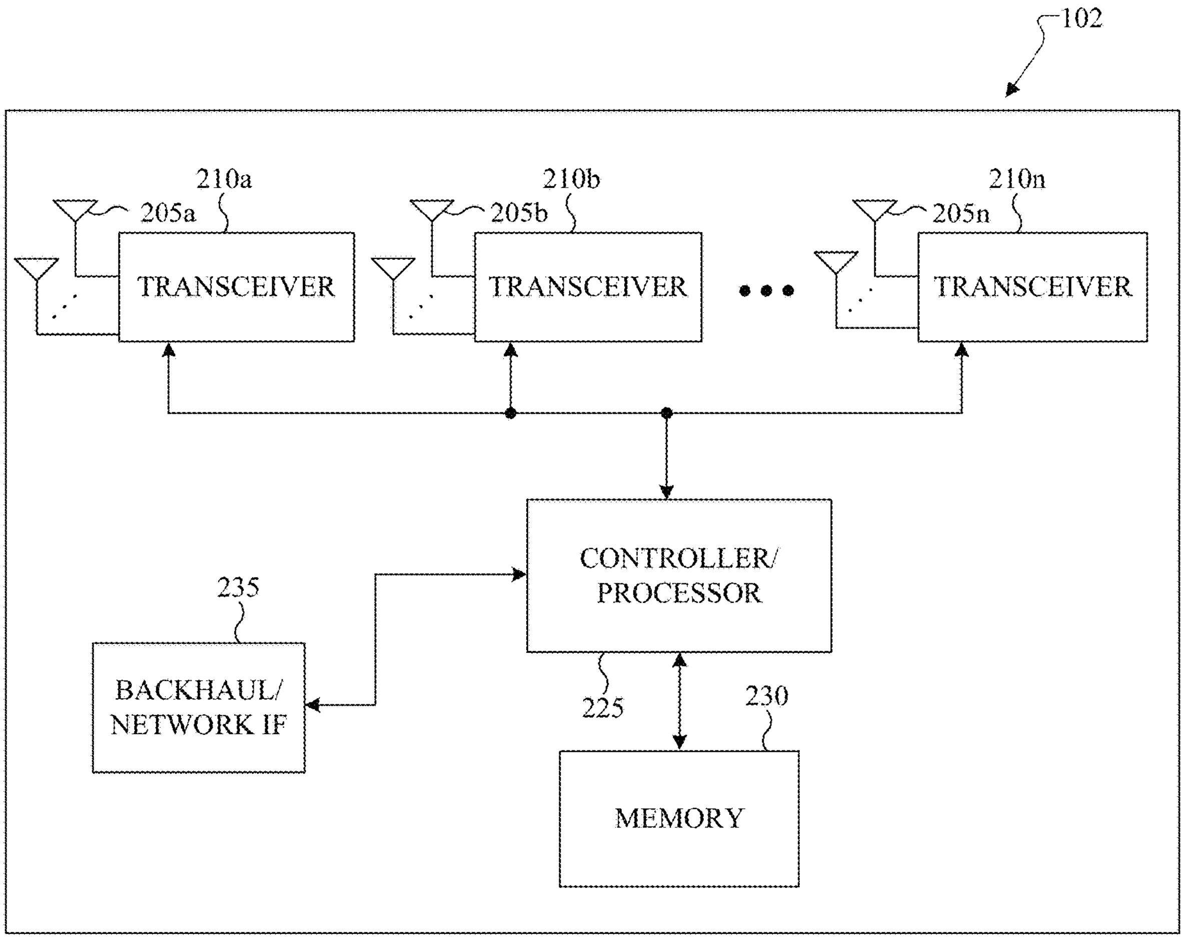
FIG. 2 illustrates an example of gNB according to various embodiments of the present disclosure.
Figure 3:
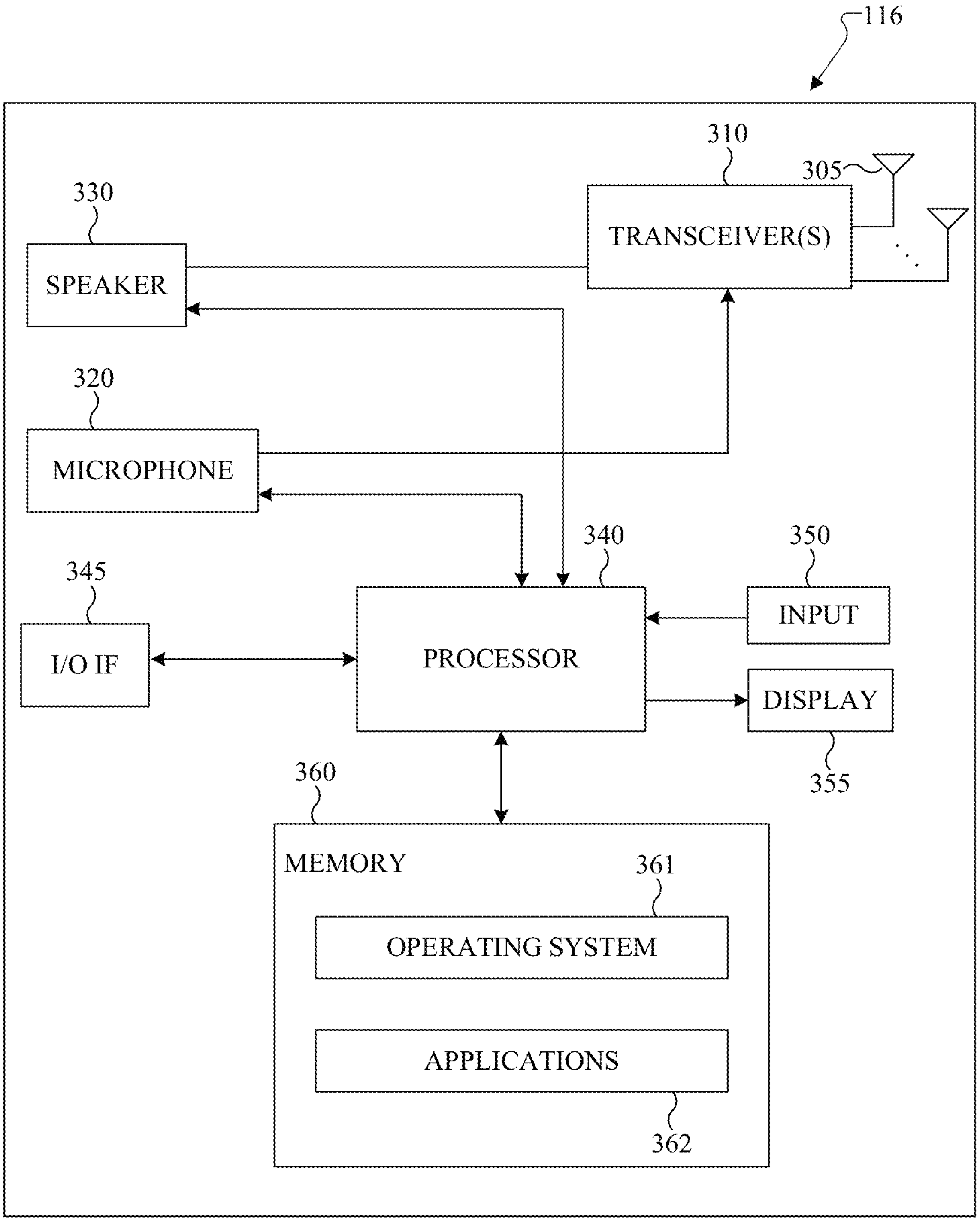
FIG. 3 illustrates an example of UE according to various embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably arranged communications system.

FIG. 1 illustrates an example wireless network according to various embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise; a UE 113, which may be a WiFi hotspot; a UE 114, which may be located in a first residence; a UE 115, which may be located in a second residence; and a UE 116, which may be a mobile device, such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3$^{rd}$ generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, to receive CSI-RSs in wireless communication systems. In certain embodiments, and one or more of the gNBs 101-103 includes circuitry, programing, or a combination thereof, to transmit CSI-RSs in wireless communication systems.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to various embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205*a*-205*n*, multiple transceivers 210*a*-210*n*, a controller/processor 225, a memory 230, and a backhaul or network interface 235.

The transceivers 210*a*-210*n* receive, from the antennas 205*a*-205*n*, incoming RF signals, such as signals transmitted by UEs in the network 100. The transceivers 210*a*-210*n* down-convert the incoming RF signals to generate IF or baseband signals. The IF or baseband signals are processed by receive (RX) processing circuitry in the transceivers 210*a*-210*n* and/or controller/processor 225, which generates processed baseband signals by filtering, decoding, and/or digitizing the baseband or IF signals. The controller/processor 225 may further process the baseband signals.

Transmit (TX) processing circuitry in the transceivers 210*a*-210*n* and/or controller/processor 225 receives analog or digital data (such as voice data, web data, e-mail, or interactive video game data) from the controller/processor 225. The TX processing circuitry encodes, multiplexes, and/or digitizes the outgoing baseband data to generate processed baseband or IF signals. The transceivers 210*a*-210*n* up-converts the baseband or IF signals to RF signals that are transmitted via the antennas 205*a*-205*n*.

The controller/processor 225 can include one or more processors or other processing devices that control the overall operation of the gNB 102. For example, the controller/processor 225 could control the reception of UL channel signals and the transmission of DL channel signals by the transceivers 210*a*-210*n* in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205*a*-205*n* are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as processes to support transmission of CSI-RSs in wireless communication systems. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a wireless communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. Also, various components in FIG. 2 could be combined, further subdivided, or omitted and additional components could be added according to particular needs.

FIG. 3 illustrates an example UE 116 according to various embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes antenna(s) 305, a transceiver(s) 310, and a microphone 320. The UE 116 also includes a speaker 330, a processor 340, an input/output (I/O) interface (IF) 345, an input 350, a display 355, and a memory 360. The memory 360 includes an operating system (OS) 361 and one or more applications 362.

The transceiver(s) 310 receives from the antenna 305, an incoming RF signal transmitted by a gNB of the network 100. The transceiver(s) 310 down-converts the incoming RF signal to generate an intermediate frequency (IF) or baseband signal. The IF or baseband signal is processed by RX processing circuitry in the transceiver(s) 310 and/or processor 340, which generates a processed baseband signal by filtering, decoding, and/or digitizing the baseband or IF signal. The RX processing circuitry sends the processed baseband signal to the speaker 330 (such as for voice data) or is processed by the processor 340 (such as for web browsing data).

TX processing circuitry in the transceiver(s) 310 and/or processor 340 receives analog or digital voice data from the microphone 320 or other outgoing baseband data (such as web data, e-mail, or interactive video game data) from the processor 340. The TX processing circuitry encodes, multiplexes, and/or digitizes the outgoing baseband data to generate a processed baseband or IF signal. The transceiver (s) 310 up-converts the baseband or IF signal to an RF signal that is transmitted via the antenna(s) 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the transceiver(s) 310 in accordance with well-known principles. In some embodiments, the processor 340 includes at least one microprocessor or microcontroller.

The processor 340 is also capable of executing other processes and programs resident in the memory 360, such as processes to receive CSI-RSs in wireless communication systems.

The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input 350 and the display 355*m* which includes for example, a touchscreen, keypad, etc., The operator of the UE 116 can use the input 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). In another example, the transceiver(s) 310 may include any number of transceivers and signal processing chains and may be connected to any number of antennas. Also, while FIG. 3 illustrates the UE 116 configured as a mobile telephone or smartphone, UEs could be configured to operate as other types of mobile or stationary devices.

Figure 4:
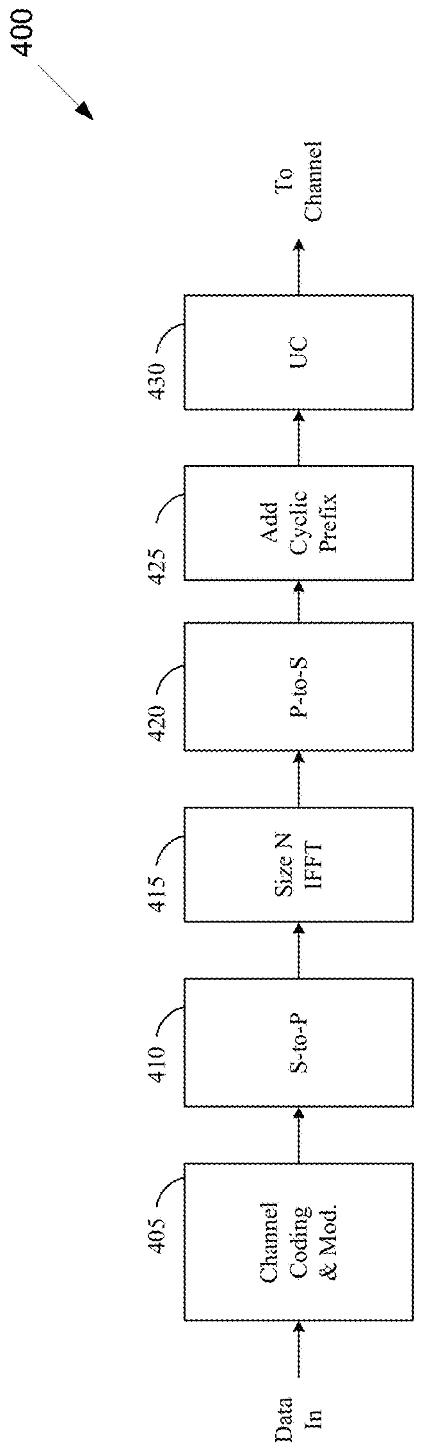
FIGS. 4 and 5 illustrate example of wireless transmit and receive paths according to various embodiments of the present disclosure.
Figure 5:
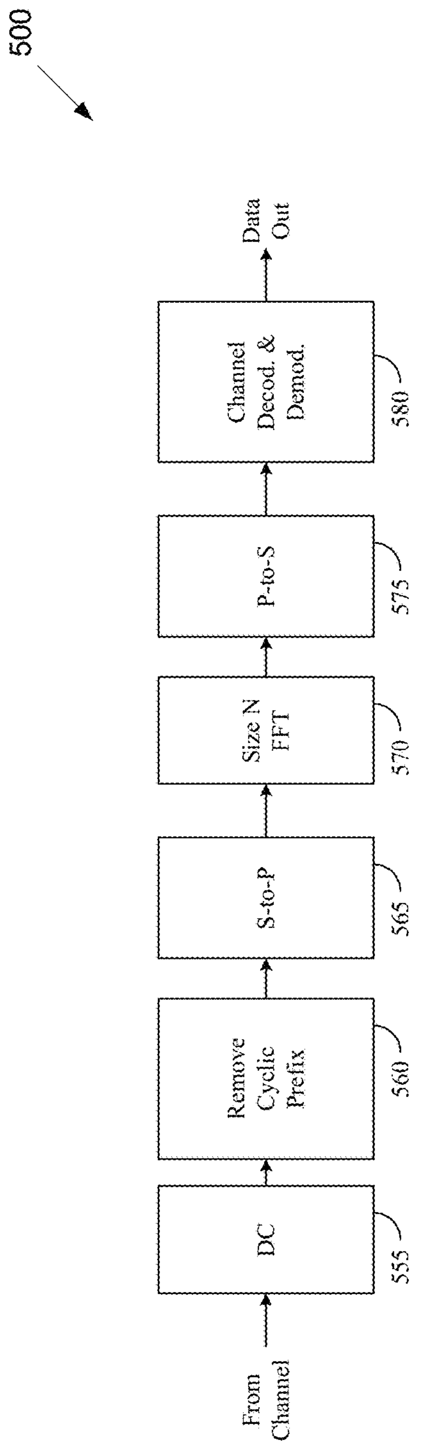

FIG. 4 and FIG. 5 illustrate example wireless transmit and receive paths according to various embodiments of the present disclosure. In the following description, a transmit path 400 may be described as being implemented in a gNB (such as the gNB 102), while a receive path 500 may be described as being implemented in a UE (such as a UE 116). However, it may be understood that the receive path 500 can be implemented in a gNB and that the transmit path 400 can be implemented in a UE. In some embodiments, the receive path 500 is configured to receive CSI-RSs in wireless communication systems.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols.

The serial-to-parallel block 410 converts (such as de-multiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the gNB 102 arrives at the UE 116 after passing through the wireless channel, and reverse operations to those at the gNB 102 are performed at the UE 116.

As illustrated in FIG. 5, the downconverter 555 downconverts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the gNBs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the gNBs 101-103 and may implement the receive path 500 for receiving in the downlink from the gNBs 101-103.

Each of the components in FIG. 4 and FIG. 5 can be implemented using only hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 415 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

A unit for DL signaling or for UL signaling on a cell is referred to as a slot and can include one or more symbols. A bandwidth (BW) unit is referred to as a resource block (RB). One RB includes a number of sub-carriers (SCs). For example, a slot can have duration of one millisecond and an RB can have a bandwidth of 180 KHz and include 12 SCs with inter-SC spacing of 15 KHz. A slot can be either full DL slot, or full UL slot, or hybrid slot similar to a special subframe in time division duplex (TDD) systems.

DL signals include data signals conveying information content, control signals conveying DL control information (DCI), and reference signals (RS) that are also known as pilot signals. A gNB transmits data information or DCI through respective physical DL shared channels (PDSCHs) or physical DL control channels (PDCCHs). A PDSCH or a PDCCH can be transmitted over a variable number of slot symbols including one slot symbol. A UE can be indicated a spatial setting for a PDCCH reception based on a configuration of a value for a TCI state of a CORESET where the UE receives the PDCCH. The UE can be indicated a spatial setting for a PDSCH reception based on a configuration by higher layers or based on an indication by a DCI format scheduling the PDSCH reception of a value for a TCI state. The gNB can configure the UE to receive signals on a cell within a DL bandwidth part (BWP) of the cell DL BW.

A gNB transmits one or more of multiple types of RS including channel state information RS (CSI-RS) and demodulation RS (DMRS). A CSI-RS is primarily intended for UEs to perform measurements and provide channel state information (CSI) to a gNB. For channel measurement, non-zero power CSI-RS (NZP CSI-RS) resources are used. For interference measurement reports (IMRs), CSI interference measurement (CSI-IM) resources associated with a zero power CSI-RS (ZP CSI-RS) configuration are used. A CSI process consists of NZP CSI-RS and CSI-IM resources. A UE can determine CSI-RS transmission parameters through DL control signaling or higher layer signaling, such as a radio resource control (RRC) signaling from a gNB. Transmission instances of a CSI-RS can be indicated by DL control signaling or configured by higher layer signaling. A DMRS is transmitted only in the BW of a respective PDCCH or PDSCH and a UE can use the DMRS to demodulate data or control information.

UL signals also include data signals conveying information content, control signals conveying UL control information (UCI), DMRS associated with data or UCI demodulation, sounding RS (SRS) enabling a gNB to perform UL channel measurement, and a random access (RA) preamble enabling a UE to perform random access. A UE transmits data information or UCI through a respective physical UL shared channel (PUSCH) or a physical UL control channel (PUCCH). A PUSCH or a PUCCH can be transmitted over a variable number of slot symbols including one slot symbol. The gNB can configure the UE to transmit signals on a cell within an UL BWP of the cell UL BW.

UCI includes hybrid automatic repeat request acknowledgement (HARQ-ACK) information, indicating correct or incorrect detection of data transport blocks (TBs) in a PDSCH, scheduling request (SR) indicating whether a UE has data in the buffer of UE, and CSI reports enabling a gNB to select appropriate parameters for PDSCH or PDCCH transmissions to a UE. HARQ-ACK information can be configured to be with a smaller granularity than per TB and can be per data code block (CB) or per group of data CBs where a data TB includes a number of data CBs.

A CSI report from a UE can include a channel quality indicator (CQI) informing a gNB of a largest modulation and coding scheme (MCS) for the UE to detect a data TB with a predetermined block error rate (BLER), such as a 10% BLER, of a precoding matrix indicator (PMI) informing a gNB how to combine signals from multiple transmitter antennas in accordance with a MIMO transmission principle, and of a rank indicator (RI) indicating a transmission rank for a PDSCH. UL RS includes DMRS and SRS. DMRS is transmitted only in a BW of a respective PUSCH or PUCCH transmission. A gNB can use a DMRS to demodulate information in a respective PUSCH or PUCCH. SRS is transmitted by a UE to provide a gNB with an UL CSI and, for a TDD system, an SRS transmission can also provide a PMI for DL transmission. Additionally, in order to establish synchronization or an initial higher layer connection with a gNB, a UE can transmit a physical random-access channel.

In the present disclosure, a beam is determined by either of: (1) a TCI state, which establishes a quasi-colocation (QCL) relationship between a source reference signal (e.g., synchronization signal/physical broadcasting channel (PBCH) block (SSB) and/or CSI-RS) and a target reference signal; or (2) spatial relation information that establishes an association to a source reference signal, such as SSB or CSI-RS or SRS. In either case, the ID of the source reference signal identifies the beam.

The TCI state and/or the spatial relation reference RS can determine a spatial Rx filter for reception of downlink channels at the UE, or a spatial Tx filter for transmission of uplink channels from the UE.

Rel.14 LTE and Rel.15 NR support up to 32 CSI-RS antenna ports which enable an eNB to be equipped with a large number of antenna elements (such as 64 or 128). In this case, a plurality of antenna elements is mapped onto one CSI-RS port. For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies) as illustrated in FIG. 6.

Figure 6:
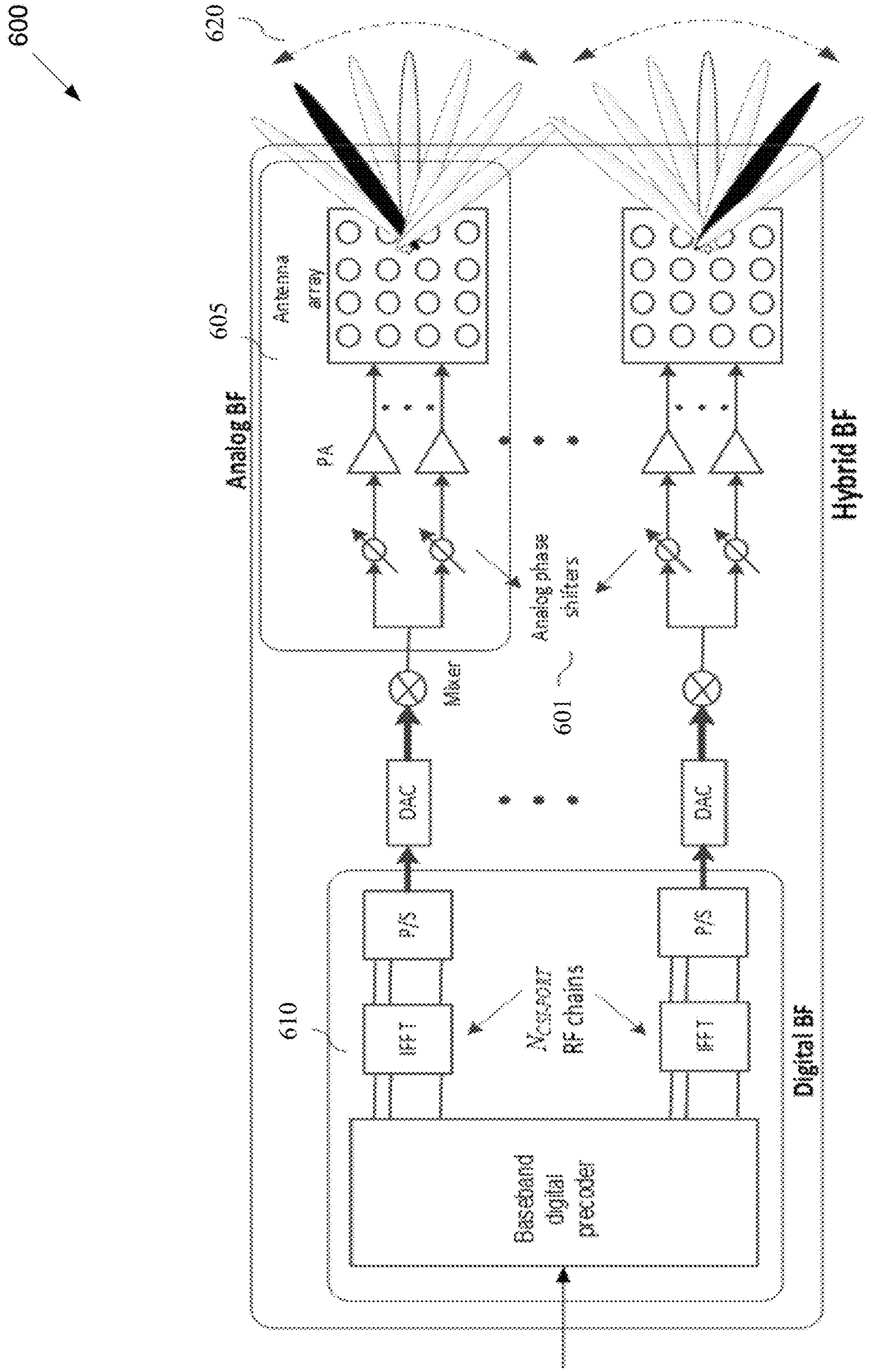
FIG. 6 illustrates an example of antenna structure according to various embodiments of the present disclosure.

FIG. 6 illustrates an example antenna structure 600 according to various embodiments of the present disclosure. An embodiment of the antenna structure 600 shown in FIG. 6 is for illustration only.

In this case, one CSI-RS port is mapped onto a large number of antenna elements which can be controlled by a bank of analog phase shifters 601. One CSI-RS port can then correspond to one sub-array which produces a narrow analog beam through analog beamforming 605. This analog beam can be configured to sweep across a wider range of angles 620 by varying the phase shifter bank across symbols or subframes. The number of sub-arrays (equal to the number of RF chains) is the same as the number of CSI-RS ports $N_{CSI\text{-}PORT}$. A digital beamforming unit 610 performs a linear combination across $N_{CSI\text{-}PORT}$ analog beams to further increase precoding gain. While analog beams are wideband (hence not frequency-selective), digital precoding can be varied across frequency sub-bands or resource blocks. Receiver operation can be conceived analogously.

Since the aforementioned system utilizes multiple analog beams for transmission and reception (wherein one or a small number of analog beams are selected out of a large number, for instance, after a training duration—to be performed from time to time), the term "multi-beam operation" is used to refer to the overall system aspect. This includes, for the purpose of illustration, indicating the assigned DL or UL TX beam (also termed "beam indication"), measuring at least one reference signal for calculating and performing beam reporting (also termed "beam measurement" and "beam reporting," respectively), and receiving a DL or UL transmission via a selection of a corresponding RX beam.

The aforementioned system is also applicable to higher frequency bands such as >52.6 GHz. In this case, the system can employ only analog beams. Due to the O2 absorption loss around 60 GHz frequency (~10 dB additional loss @100 m distance), larger number of and sharper analog beams (hence larger number of radiators in the array) may be needed to compensate for the additional path loss.

Figure 7:
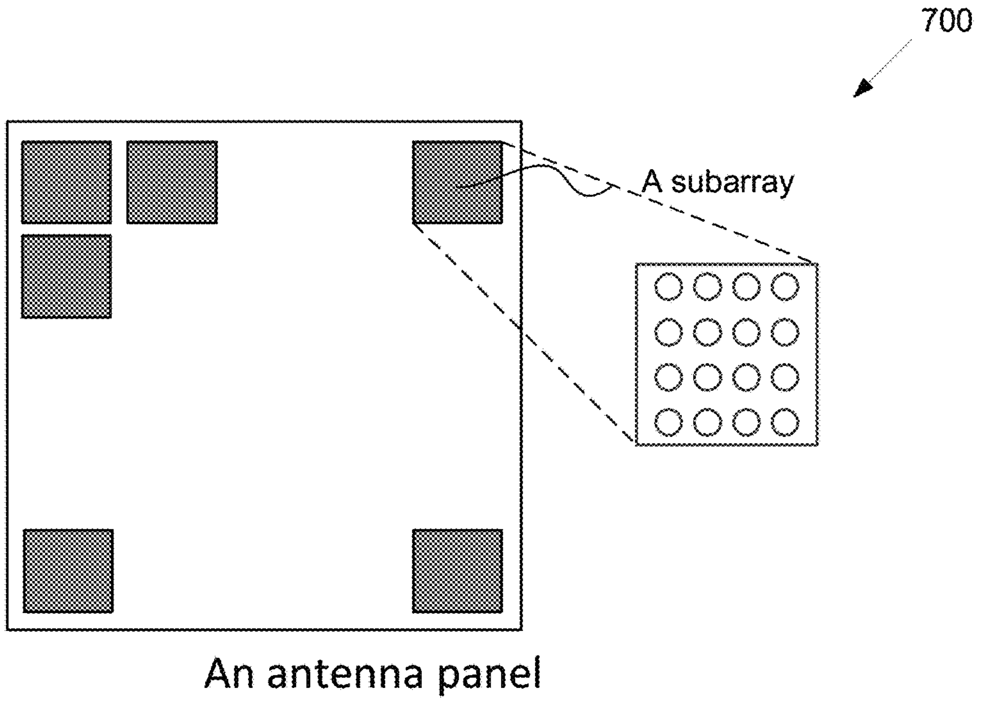
FIG. 7 illustrates an example of an antenna panel comprising antenna elements according to various embodiments of the present disclosure.

FIG. 7 illustrates an example of an antenna panel comprising antenna elements 700 according to various embodiments of the present disclosure. An embodiment of the antenna panel comprising $N_T$ antenna elements 700 shown in FIG. 7 is for illustration only.

FIG. 7 an antenna panel comprising $N_1N_2$ subarrays per polarization dimension, each of which consists of $N_A=N_3N_4$ antenna elements. $N_D=2N_1N_2$ is the number of subarrays. Digital beamforming is performed across $N_D$ subarrays and each of the resulting $N_D$ data steams go through analog beamforming at one subarray.

Figure 8:
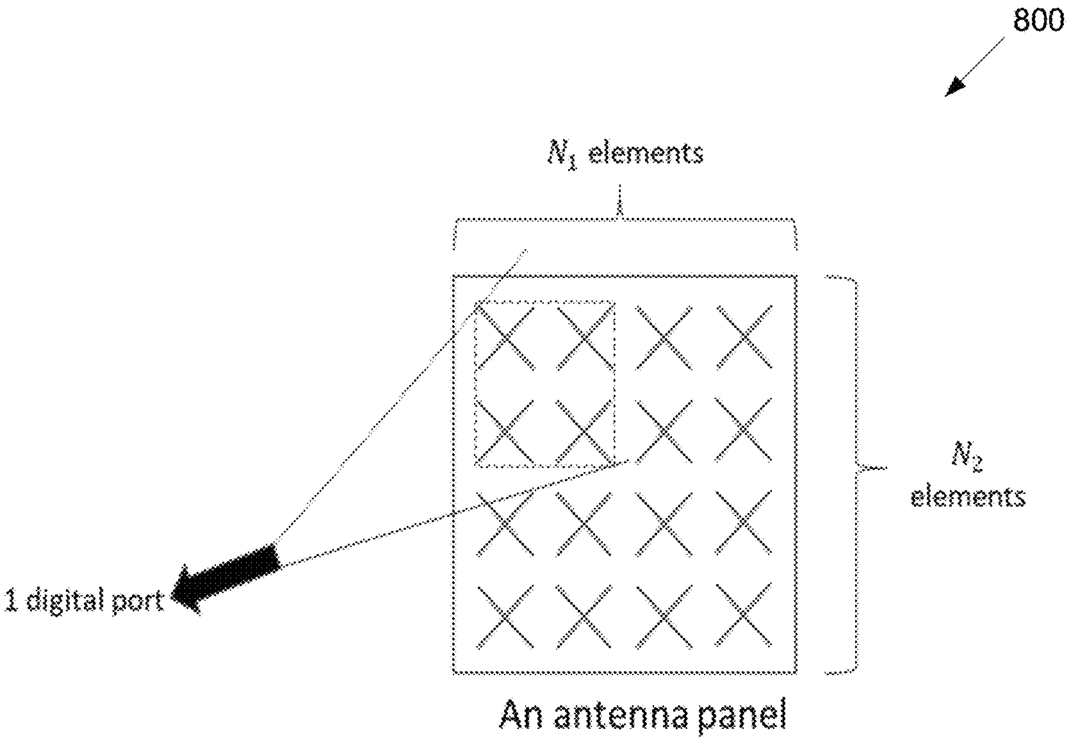
FIG. 8 illustrates an example of an antenna panel at a base station according to various embodiments of the present disclosure.

FIG. 8 illustrates an example of an antenna panel at a base station 800 according to various embodiments of the present disclosure.

FIG. 8 depicts an antenna panel at a BS comprising $N_1N_2$ cross-polarized antenna elements. The total number of antenna elements counting polarizations is $N_T=2N_1N_2$. The $N_T$ antenna elements are abstracted into $N_D$ digital ports. In the current CSI reporting framework, UE measures the downlink channel vector $h^{(N_D \times 1)}$ across $N_D$ digital ports through periodic, semi-persistent, or aperiodic CSI-RS transmissions in the downlink as illustrated in 3GPP TS 38.211 and 3GPP TS 38.214.

Figure 9:
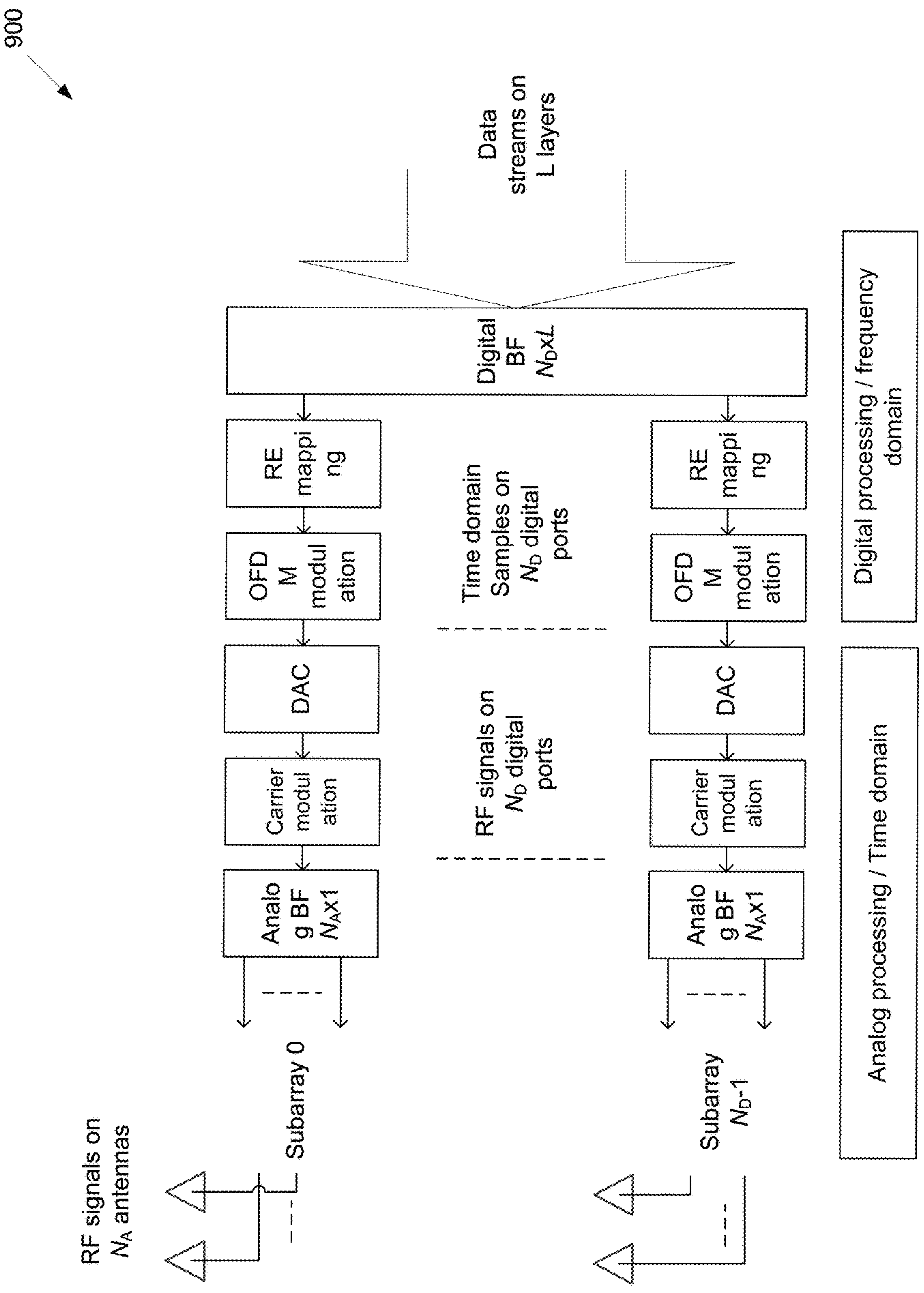
FIG. 9 illustrates an example of RF frontend and baseband according to various embodiments of the present disclosure.

FIG. 9 illustrates an example of RF frontend and baseband 900 according to various embodiments of the present disclosure. An embodiment of the RF frontend and baseband 900 shown in FIG. 9 is for illustration only.

FIG. 9 illustrates an example of RF frontend and baseband implementation for a base station 800 according to various embodiments of the present disclosure. An embodiment of the RF frontend and baseband implementation for a base station 800 shown in FIG. 8 is for illustration only.

FIG. 9 shows an RF frontend and baseband implementation for a base station equipped with the antenna panel in FIG. 7. This RF frontend is one possible implementation of hybrid analog-digital beamforming. The $N_T$ RF signals to be emitted from the antenna panel is constructed according to FIG. 8.

Starting from the right, L data streams, or L sequences of modulation symbols are provided to digital beamformer (BF), which may convert L streams to $N_D$ data streams, with multiplying a digital precoder $$p_k^D,$$

whose dimension is $N_D \times L$, on the resource elements comprising a physical resource block (PRB) bundle k, wherein $k=0, \ldots, N_{PRB\text{-}bundles}-1$, and $N_{PRB\text{-}bundles}$ is the total number of PRB bundles that the data stream is mapped to.

The modulation symbols on each of $N_D$ data streams are then mapped to resource elements, go through OFDM modulation, and are finally converted to time domain samples. These time domain samples are converted to analog, go through carrier modulation, and an analog signal is obtained for each of these $N_D$ paths.

Then, the analog signal goes through analog BF block, where an analog precoder $$p_d^A$$

of size $N_A \times 1$ is applied for path d, where d=0, . . . , $N_D-1$. Applying analog BFs for the signals on all the $N_D$ paths, the RF signals on $N_T=N_A \times N_D$ antenna elements are constructed.

In 5G-advanced or 6G communications, extremely large number of antennas (e.g., $N_T=2048$) and large number of subarrays (e.g., $N_D=128$) are expected to be used. Analog beamforming is performed across each subarray, and digital beamforming is performed across subarrays, with each subarray abstracted into 1 digital port. This leads to a larger number of digital ports (e.g., $N_D=128$ or 256) and CSI needs to be estimated at each of these ports, for downlink digital precoding. Existing CSI-RS designs 3GPP2 specification covers only up to 32 ports and therefore, significant new designs are needed to accommodate up to 256 ports (increase of up to a factor of 8).

FIG. 7 depicts an antenna panel at a base station (BS) comprising $N_1N_2$ cross-polarized antenna elements. The total number of antenna elements counting polarizations is $N_T=2N_1N_2$. The $N_T$ antenna elements are abstracted into $N_D$ digital ports. In the current CSI reporting framework, UE measures the downlink channel vector $h^{(N_D \times 1)}$ across $N_D$ digital ports through periodic, semi-persistent, or aperiodic CSI-RS transmissions in the downlink as specified in 3GPP specification.

The present disclosure provides channel state information reference signal (CSI-RS) designs for 64, 128, and 256 digital ports.

Following are the key aspects involved in CSI-RS design.

CSI-RS sequence generation and mapping CSI-RS sequences and CSI-RS ports to resource elements (REs) so as to ensure efficient usage of resources and minimize interference between CSI-RS transmission from different ports, as well as reduce channel estimation errors due to thermal noise. In the present disclosure, RE mappings with nonuniform cdm allocations is provided, i.e., the shapes of the time-frequency regions allocated to different cdm groups may be different. In addition, the number of ports in different cdm groups may also be different.

In the present disclosure, a general framework to generate cdm spreading sequences for general cdm shapes of the form FD-$2^K$-TD-$2^L$ is provided.

RRC signaling for the network to indicate the CSI-RS sequences and RE mapping to the UE. In order to handle the cases of different cdm shapes and sizes for different cdm groups, a new CSI-RS-cdmInfo IE that includes information on the cdm type (shape and number of ports) is provided.

In one embodiment, sequence generation and RE mapping is provided. In such embodiment, REs in a TTI are indexed by the tuple (k,l), where $$k \in \{0, 1, \ldots, N_{RB}N_{SC}^{RB}-1\}$$

is the subcarrier (SC) index and $$l \in \{0, 1, \ldots, N_{symb}^{TTI}-1\}$$

is the OFDM symbol index. Here, $N_{RB}$ is the number of resource blocks (RBs) in the bandwidth configured for CSI-RS reception by the UE, $$N_{SC}^{RB}$$

is the number of SC in one RB, and $$N_{symb}^{TTI}$$

is the number of OFDM symbols in one TTI. The reference point for k=0 is SC 0 in common resource block 0. For the purpose of RE allocation to CSI-RS, RBs are grouped into RB clusters, with each RB cluster consisting of $N_c(\in\{1, 2, \ldots,\})$ RBs. The last $N_{RB}-\lfloor N_{RB}/N_c \rfloor N_c \equiv N_{RB}-\mathrm{mod}(N_{RB}, N_c)$ "orphan" RBs are left out of the allocation. The SC index k can be expressed in terms of the RB cluster index $n\in\{0, 1, \ldots, \lfloor N_{RB}/N_c-1\}$ and the SC index $$\tilde{k} \in \{0, 1, \ldots, N_{SC}^{RB}N_c-1\}$$

in RB cluster $$n, \text{ as } k = nN_{SC}^{RB}N_c + \tilde{k}.$$

Conversely, given k, one can write $$n = \lfloor k/(N_{SC}^{RB}N_c) \rfloor \text{ and } \tilde{k} = \mathrm{mod}(k, N_{SC}^{RB}N_c).$$

Figure 10:
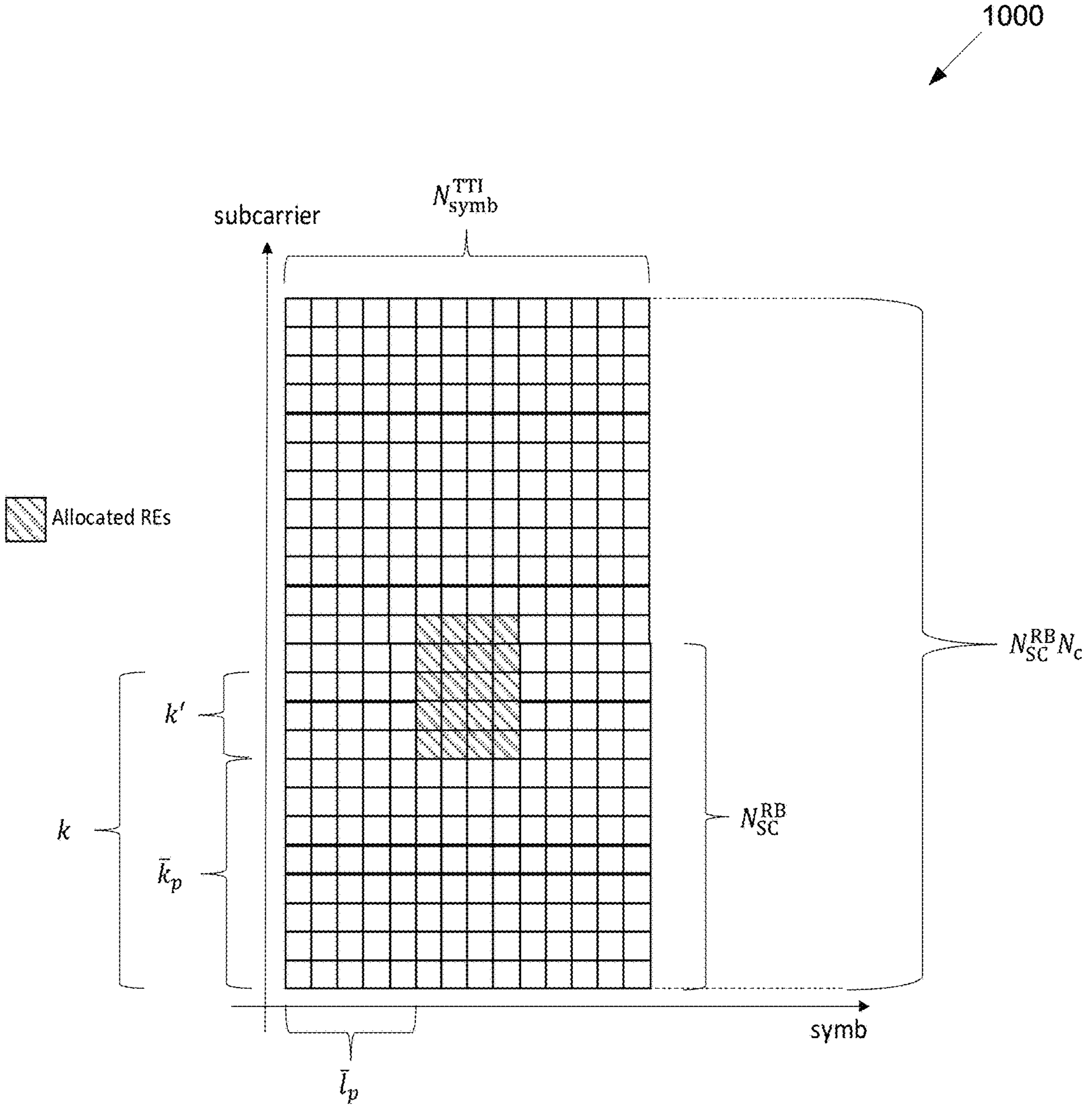
FIG. 10 illustrates an example of RE allocation according to various embodiments of the present disclosure.

For RE allocation, the X CSI-RS ports are divided into one or more CDM groups, with a contiguous set of REs (in time and frequency) allocated to each CDM group such that all ports belonging to the CDM group transmit on all REs allocated to the CDM group. Moreover, the allocation pattern to each CDM group is periodic in frequency, repeated across every $\lceil 1/\rho \rceil$ of the RBs configured for CSI-RS reception by the UE, where $\rho>0$ is the RB-cluster-level density of the CSI-RS mapping. Examples of such allocations are depicted in FIG. 10, for $N_c=2$. The index of the first OFDM symbol where port p transmits is denoted by $$\bar{l}_p \in \{0, 1, \ldots, N_{symb}^{TTI}-1\}.$$

The lowest SC index in the first RB cluster where port p transmits is denoted by $$\tilde{k}_p \in \{0, 1, \ldots, N_{SC}^{RB}N_c-1\}.$$

FIG. 10 illustrates an example of RE allocation 1000 according to various embodiments of the present disclosure. An embodiment of the RE allocation 1000 shown in FIG. 10 is for illustration only.

The signal transmitted by CSI-RS port p on RE (k,l) within the RBs occupied by the CSI-RS resource for which the UE is configured, is given by $$a_{k,l}^{(p)} = \beta_{CSIRS} \cdot w_f^{(p)}(k') \cdot w_t^{(p)}(l') \cdot r_{l,n_{s,f}}(m').$$

Here $$k = nN_{SC}^{RB}N_c + \bar{k}_p + k',\ l = \bar{l}_p + l',\ n = \lfloor k/(N_{SC}^{RB}N_c) \rfloor$$

is the RB cluster index, $$m' = \lfloor 2n\rho \rfloor + k' + \lfloor \bar{k}_p \rho/(N_{SC}^{RB}N_c) \rfloor, \text{ and } r(\cdot)$$

is a QPSK-modulated CSI-RS sequence defined as $$r(m) = \frac{1}{\sqrt{2}}(1 - 2\cdot c(2m)) + j\frac{1}{\sqrt{2}}(1 - 2\cdot c(2m+1))$$

where c(·) is the PN sequence as defined in 3GPP standard specification, and initialized at the beginning of each OFDM symbol. The UE may assume that for a non-zero-power CSI-RS, $\beta_{CSIRS}>0$ is chosen such that the power offset specified by the parameter powerControlOffsetSS in the NZP-CSI-RS-Resource IE is fulfilled.

The quantities $$w_f^{(p)}(k') \text{ and } w_t^{(p)}(l')$$

are CDM spreading sequences in frequency and time, respectively, corresponding to port p, and depend on the CDM shape as well as the port index p. For N CDM groups with sizes $L_0, L_1, \ldots, L_{N-1}$, (i.e., for group j, the CDM type is cdm$L_j$-FDx-TDy), the port index p in CDM group j is given by $p=3000+s+L_0+\ldots+L_{j-1}$, where s is the CDM sequence index corresponding to port p, and this parameter $s\in\{0, 1, \ldots, L_j-1\}$ determines the CDM sequences $$w_f^{(p)} \text{ and } w_t^{(p)}$$

corresponding to port p, for a given CDM shape.

One embodiment for the choice of CDM sequences for CDM types of the form cdm$2^{K+L}$–FD$2^K$–TD$2^L$ for non-negative integers K, L is described here. For sequence index $s\in\{0, 1, \ldots, 2^{K+L}-1\}$, let $[b_{K+L-1} \ldots b_0]$ be the binary representation of s using (K+L) bits. Let $s_f\in\{0, 1, \ldots, 2^K-1\}$ be the integer formed from the bits $[b_{K-1} \ldots b_0]$ and let $s_t\in\{0, 1, \ldots, 2^L-1\}$ be the integer formed from the bits $[b_{K+L-1} \ldots b_K]$. Then the sequence $$w_f^{(p)}$$

corresponding to s is defined by the $$s_f^{th}$$

row of the Hadamard matrix $H_K$, and the sequence $$w_t^{(p)}$$

corresponding to s is defined by the $$s_t^{th}$$

row of the Hadamard matrix $H_L$, where the Hadamard matrix $H_m\in\{1, -1\}^{2^m\times 2^m}$ is defined recursively as $$H_0 = 1,\ H_m = \begin{pmatrix} H_{m-1} & H_{m-1} \\ H_{m-1} & -H_{m-1} \end{pmatrix}$$

for m≥1. To illustrate the generation of CDM sequences for a given CDM type using this method, TABLE 1 lists the sequences $$w_f^{(p)} \text{ and } w_t^{(p)}$$

corresponding to cdm32-FD4-TD8, for a few values of the sequence index s.

Table 1. CDM Sequences for cdm32-FD4-TD8

TABLE 1

| CDM sequences for cdm32-FD4-TD8 | | | | |
|---|---|---|---|---|
| Index s | $s_f$ | $s_t$ | $[w_f(0)\ w_f(1)\ w_f(2)\ w_f(3)]$ | $[w_t(0)\ w_t(1)\ w_t(2)\ w_t(3)\ w_t(4)\ w_t(5)\ w_t(6)\ w_t(7)]$ |
| 0 | 0 | 0 | [1 1 1 1] | [1 1 1 1 1 1 1 1] |
| 1 | 1 | 0 | [1 −1 1 −1] | [1 1 1 1 1 1 1 1] |
| 2 | 2 | 0 | [1 1 −1 −1] | [1 1 1 1 1 1 1 1] |
| 3 | 3 | 0 | [1 −1 −1 1] | [1 1 1 1 1 1 1 1] |
| 4 | 0 | 1 | [1 1 1 1] | [1 −1 1 −1 1 −1 1 −1] |
| 5 | 1 | 1 | [1 −1 1 −1] | [1 −1 1 −1 1 −1 1 −1] |
| . . . | . . . | . . . | . . . | . . . |
| 31 | 3 | 7 | [1 −1 −1 1] | [1 −1 −1 1 −1 1 1 −1] |

TABLE 2 lists some examples of parameter values for $$N_{SC}^{RB} = 12 \text{ and } N_{symb}^{TTI} = 14,$$

along with the corresponding RE mapping patterns depicted in FIGS. 11-20. The quantities $$w_f^{(p)}(k'),\ w_t^{(p)}(l')$$

for each port p (through the CDM group index and cdm-Type), as well as $k_i$, $l_i$, $N_c$, ρ, and the number of ports (X) are indicated to the UE via RRC signaling, through enhancements to CSI-RS-ResourceMapping IE, as described in the following subsection.

The network decides the RRC-signaled parameters based on operating scenario such as a number of ports to support (X), a channel coherence time, and a channel coherence bandwidth. For example, the parameter N_c is chosen based on X, with a higher X generally requiring a higher N_c. A larger channel coherence time and/or frequency may generally result in the choice of a larger CDM group size, and vice versa.

TABLE 2

CSI-RS Locations for $N_{SC}^{RB} = 12$, $N_{symb}^{TTI} = 14$

| Row | Ports X | Density ρ | Cluster size $N_c$ | CDM group index j, cdm-Type | $(\bar{k}_p, \bar{l}_p)$ |
|---|---|---|---|---|---|
| 100 | 64 | 1, 0.5 | 2 | (0, 1, 2, 3, 4, 5, 6, 7) → cdm8-FD2-TD4 | $(k_0, l_0), (k_1, l_0), (k_0 + N_{sc}^{RB}, l_0), (k_1 + N_{sc}^{RB}, l_0),$ $(k_0, l_1), (k_1, l_1), (k_0 + N_{sc}^{RB}, l_1), (k_1 + N_{sc}^{RB}, l_1)$ |
| 101 | 64 | 1, 0.5 | 2 | (0, 1, 2, 3, 4, 5, 6, 7) → cdm8-FD2-TD4 | $(k_0, l_0), (k_1, l_0), (k_2, l_0), (k_3, l_0), (k_0 + N_{sc}^{RB}, l_0),$ $(k_1 + N_{sc}^{RB}, l_0), (k_2 + N_{sc}^{RB}, l_0), (k_3 + N_{sc}^{RB}, l_0)$ |
| 102 | 64 | 1, 0.5 | 1 | (0, 1, 2, 3) → cdm16-FD4-TD4 | $(k_0, l_0), (k_1, l_0), (k_0, l_1), (k_1, l_1)$ |
| 103 | 64 | 1, 0.5 | 1 | (0, 1) → cdm32-FD4-TD8 | $(k_0, l_0), (k_1, l_0)$ |
| 104 | 64 | 1, 0.5 | 1 | (0, 1) → cdm32-FD8-TD4 | $(k_0, l_0), (k_0, l_1)$ |
| 105 | 128 | 1, 0.5 | 2 | (0, 1, 2, 3, 4, 5, 6, 7, 8, 9, 10, 11, 12, 13, 14, 15) → cdm8-FD2-TD4 | $(k_0, l_0), (k_1, l_0), (k_2, l_0), (k_3, l_0), (k_0 + N_{sc}^{RB}, l_0),$ $(k_1 + N_{sc}^{RB}, l_0), (k_2 + N_{sc}^{RB}, l_0), (k_3 + N_{sc}^{RB}, l_0), (k_0, l_1),$ $(k_1, l_1), (k_2, l_1), (k_3, l_1), (k_0 + N_{sc}^{RB}, l_1), (k_1 + N_{sc}^{RB}, l_1),$ $(k_2 + N_{sc}^{RB}, l_1), (k_3 + N_{sc}^{RB}, l_1)$ |
| 106 | 256 | 1, 0.5 | 2 | (0 -- 31) → cdm8-FD2-TD4 | $(k_0, l_0), (k_0 + 2, l_0), (k_0 + 4, l_0), (k_0 + 6, l_0), (k_0 + 8, l_0), (k_0 + 10, l_0), (k_0 + 12, l_0), (k_0 + 14, l_0), (k_0 + 16, l_0), (k_0 + 18, l_0), (k_0 + 20, l_0),$ $(k_0, l_1), (k_0 + 2, l_1), (k_0 + 4, l_1), (k_0 + 6, l_1), (k_0 + 8, l_1), (k_0 + 10, l_1), (k_0 + 12, l_1), (k_0 + 14, l_1), (k_0 + 16, l_1), (k_0 + 18, l_1), (k_0 + 20, l_1),$ $(k_0, l_2), (k_0 + 2, l_2), (k_0 + 4, l_2), (k_0 + 6, l_2), (k_0 + 8, l_2), (k_0 + 10, l_2), (k_0 + 12, l_2), (k_0 + 14, l_2), (k_0 + 16, l_2), (k_0 + 18, l_2), (k_0 + 20, l_2)$ |
| 107 | 128 | 1, 0.5 | 1 | (0, 1, 2, 3, 4, 5, 6, 7) → cdm16-FD4-TD4 | 8 tuples out of $(0, l_0), (4, l_0), (8, l_0), (0, l_1), (4, l_1), (8, l_1), (0, l_2), (4, l_2), (8, l_2)$ The 1 (out of 9) excluded option is indicated through codepoint in DCI |
| 108 | 128 | 1, 0.5 | 1 | (0, 1, 2) → cdm32-FD4-TD8; 3 → cdm32-FD8-TD4 | $(0, 0), (4, 0), (8, 0), (0, l_0), (k_0, 8), (k_0, 8), (k_0, 8)$ |
| 109 | 128 | 1, 0.5 | 2 | (0, 1, 2, 3, 4, 5, 6, 7) → cdm16-FD4-TD4 | $(k_0, l_0), (k_1, l_0), (k_0 + N_{sc}^{RB}, l_0), (k_1 + N_{sc}^{RB}, l_0),$ $(k_0, l_1), (k_1, l_1), (k_0 + N_{sc}^{RB}, l_1), (k_1 + N_{sc}^{RB}, l_1)$ |
| 110 | 128 | 1, 0.5 | 2 | (0, 1, 2, 3) → cdm32-FD4-TD8 | $(k_0, l_0), (k_1, l_0), (k_0 + N_{sc}^{RB}, l_0), (k_1 + N_{sc}^{RB}, l_0)$ |

FIGS. 11 to 30 illustrate an examples of CSI-RS locations 1100-3000 according to various embodiments of the present disclosure. An embodiment of the CSI-RS locations 1100-3000 shown in FIG. 30 are for illustration only.

In particular, for row 101 in TABLE 2, a network may boost CSI-RS power by 6 dB instead of the available 9 dB, in order to avoid potential inter-modulation mismatch effects. For row 101, different 1*o* parameters may be assigned to different cells (e.g., $l_0$=0, 4, 8) to support CSI-RS for multiple cells in the same TTI.

Figure 11:
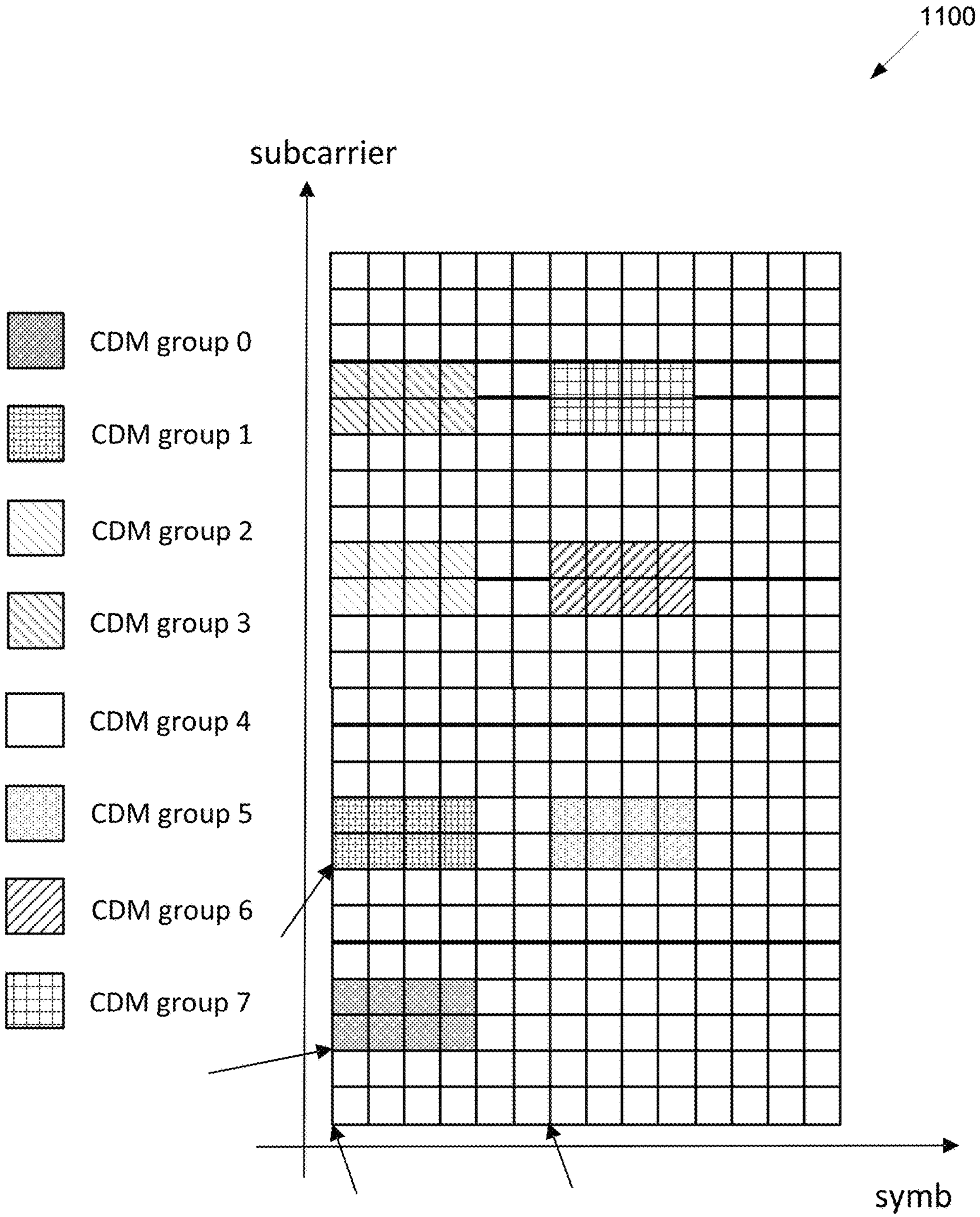
FIGS. 11 to 30 illustrate an examples of CSI-RS locations according to various embodiments of the present disclosure.

FIG. 11 illustrates an example of CSI-RS locations 1100 for row 100.

Figure 12:
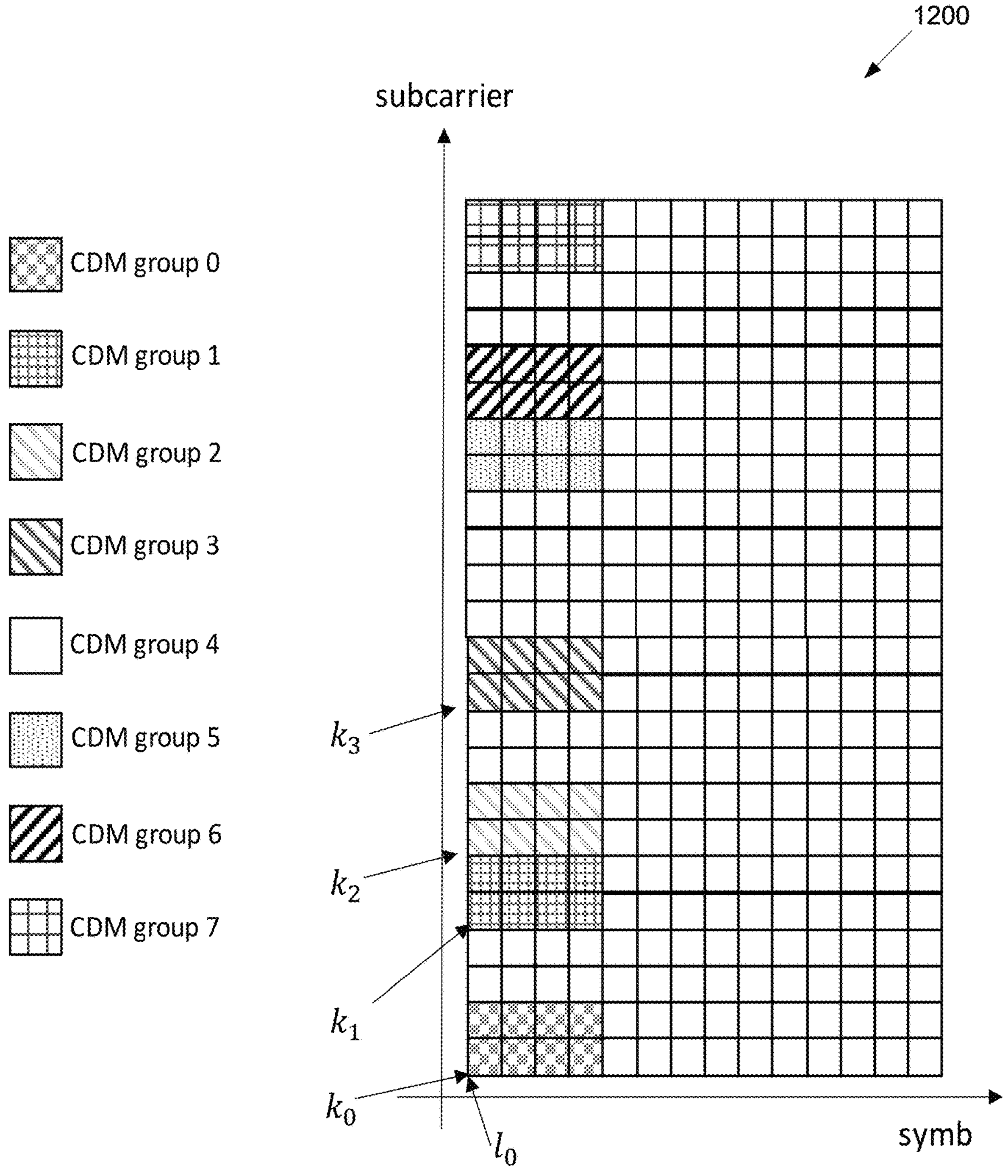

FIG. 12 illustrates an example of CSI-RS locations 1200 for row 101.

Figure 13:
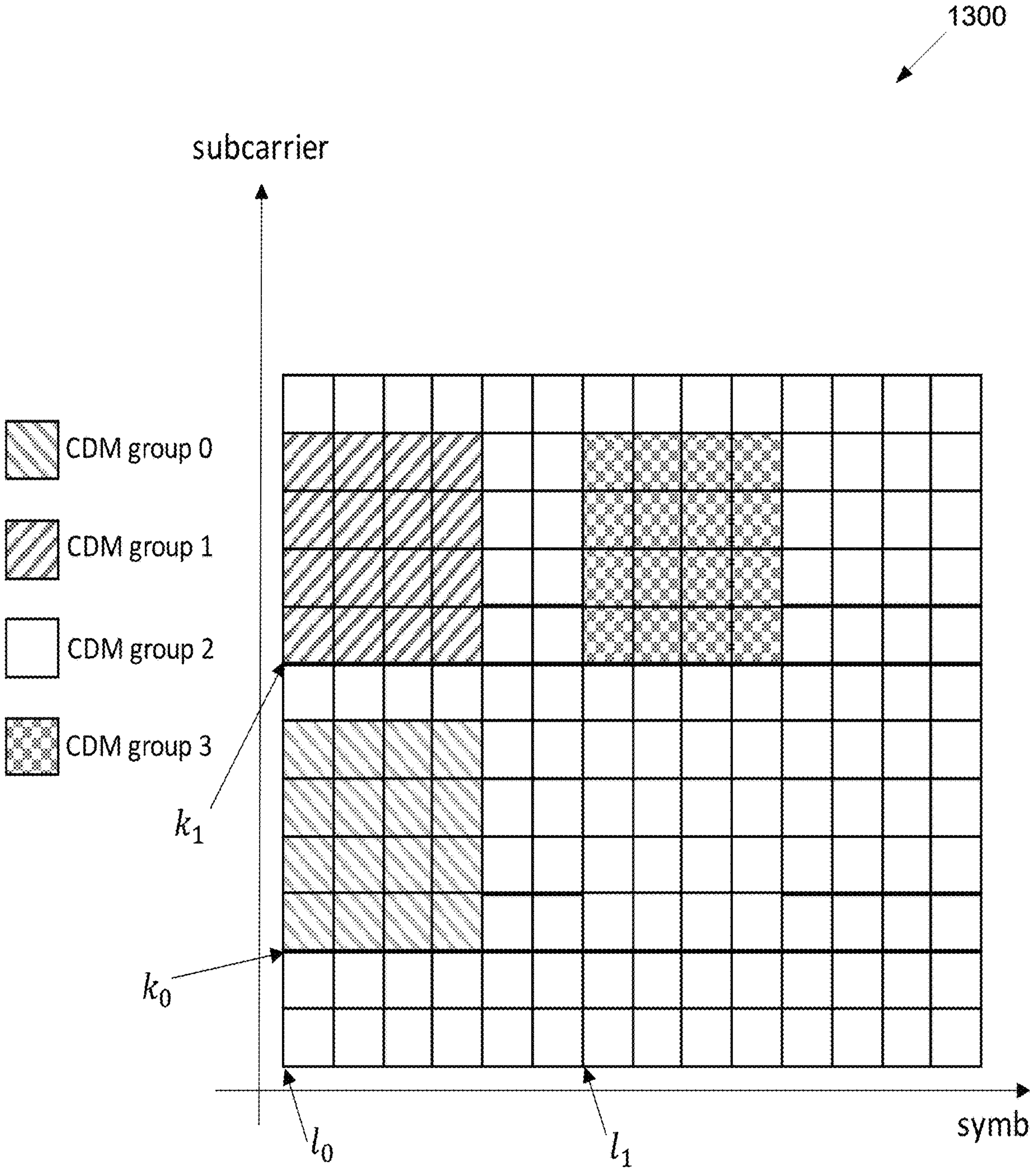

FIG. 13 illustrates an example of CSI-RS locations 1300 for row 102.

Figure 14:
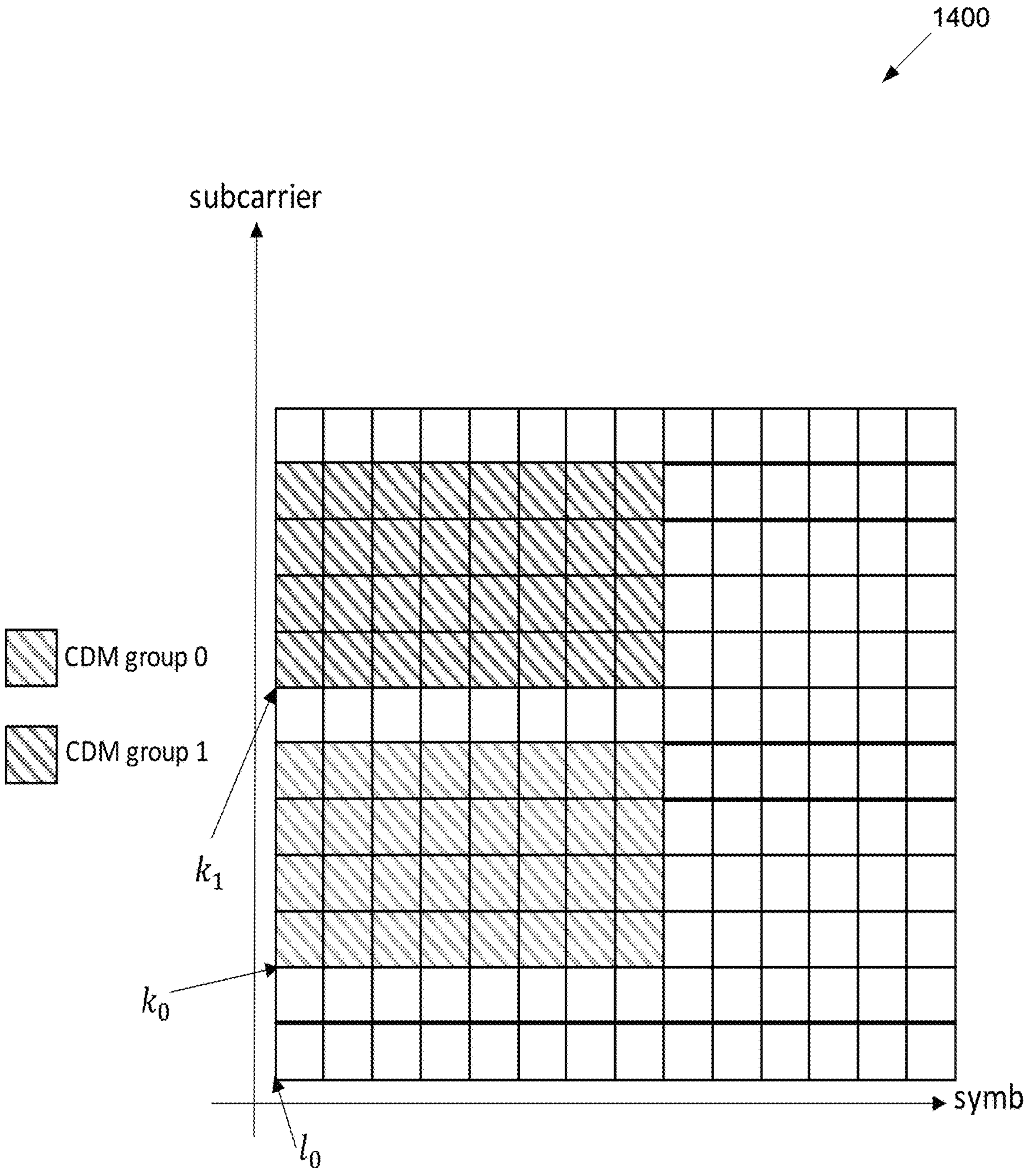

FIG. 14 illustrates an example of CSI-RS locations 1400 for row 103.

Figure 15:
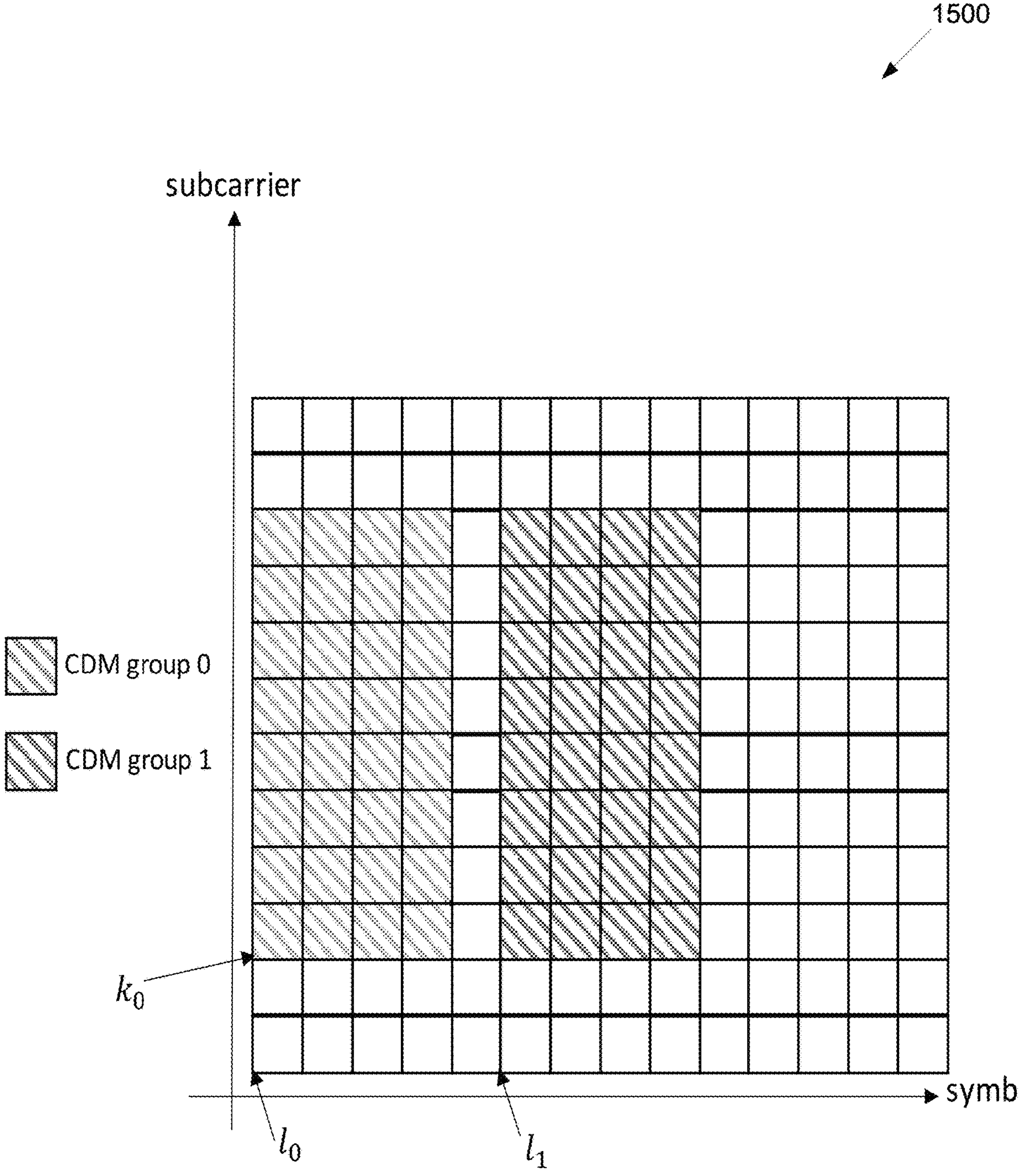

FIG. 15 illustrates an example of CSI-RS locations 1500 for row 104.

Figure 16:
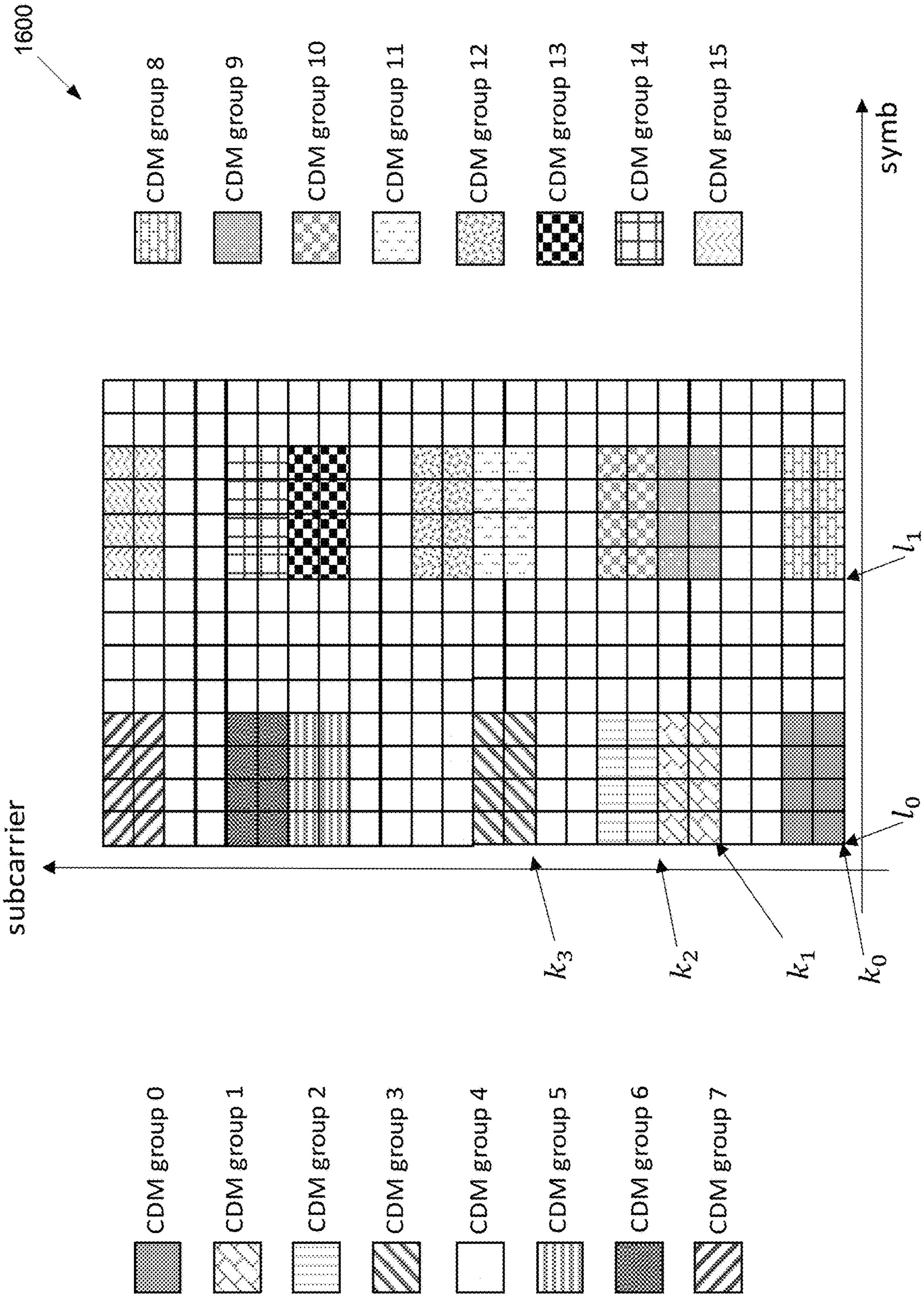

FIG. 16 illustrates an example of CSI-RS locations 1600 for row 105.

Figure 17:
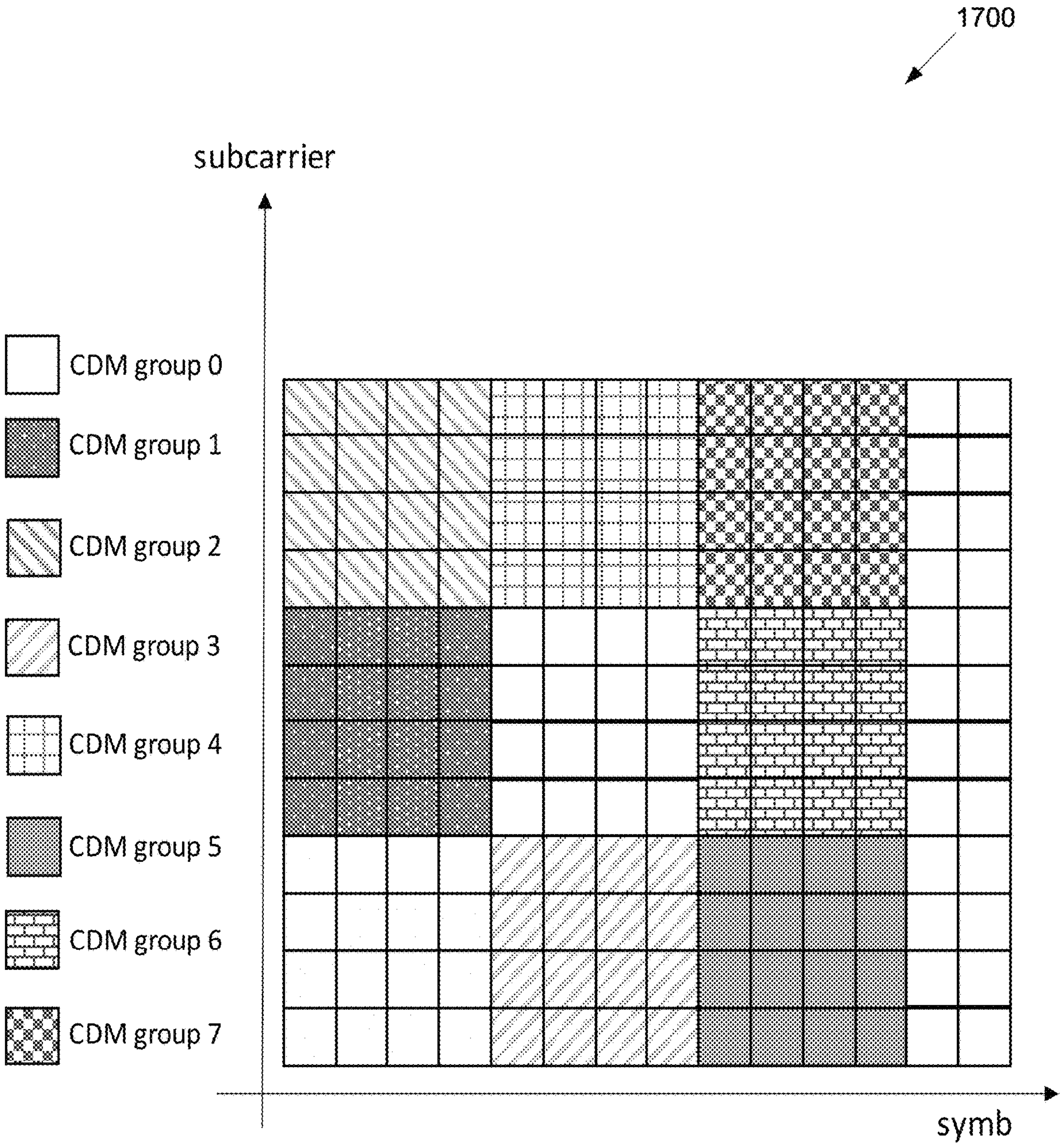

FIG. 17 illustrates an example of CSI-RS locations 1700 for row 106.

Figure 18:
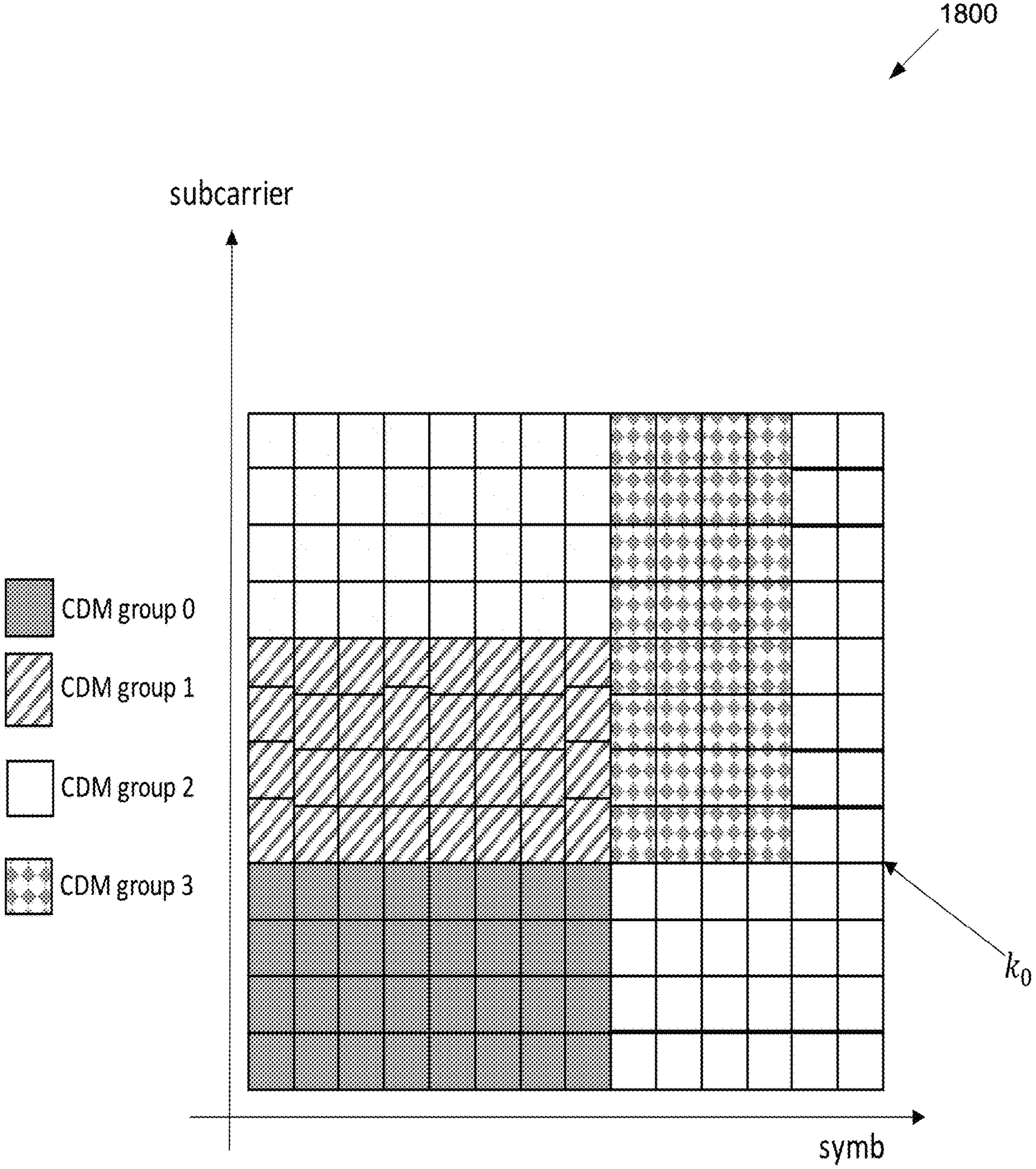

FIG. 18 illustrates an example of CSI-RS locations 1800 for row 107.

Figure 19:
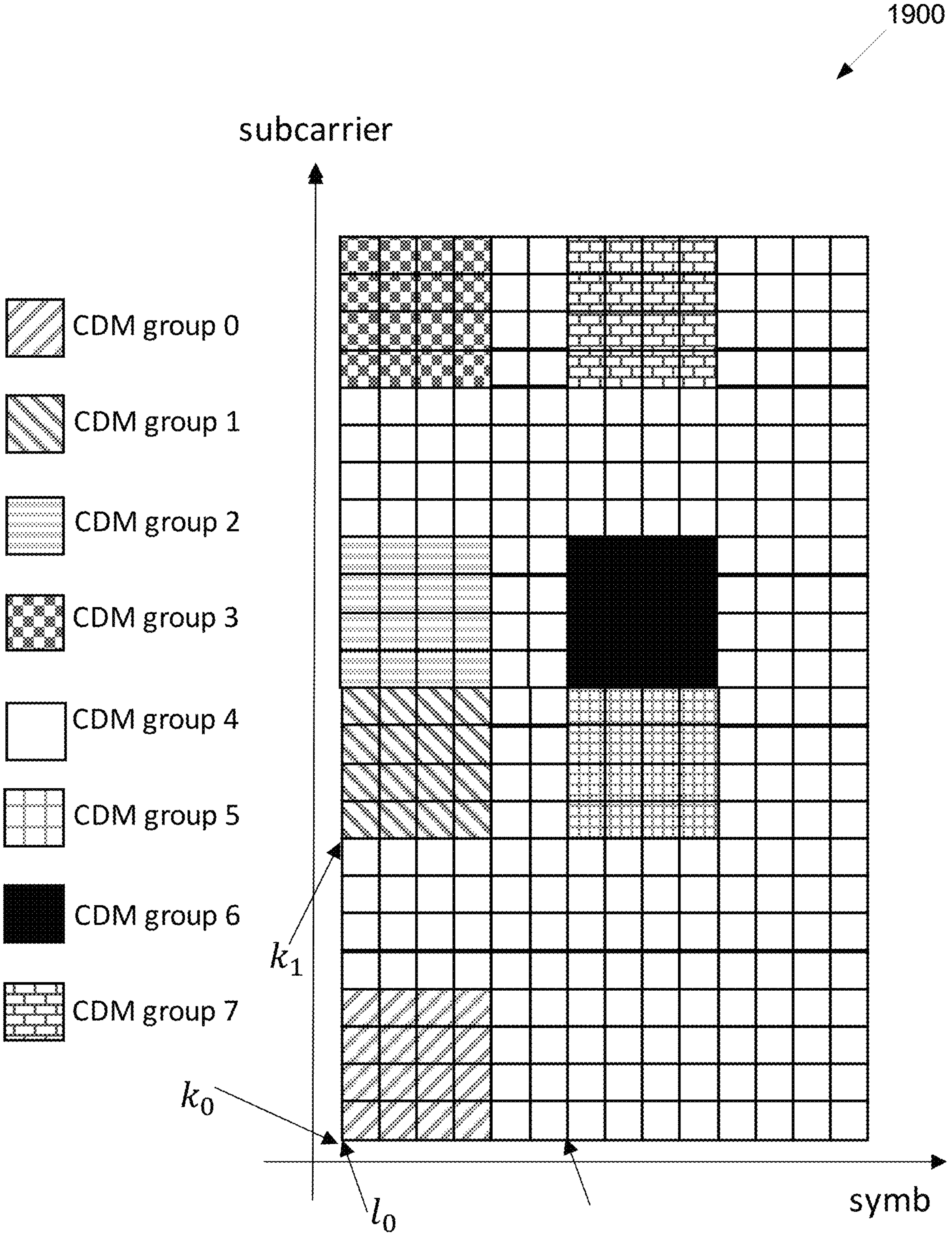

FIG. 19 illustrates an example of CSI-RS locations 1900 for row 108.

Figure 20:
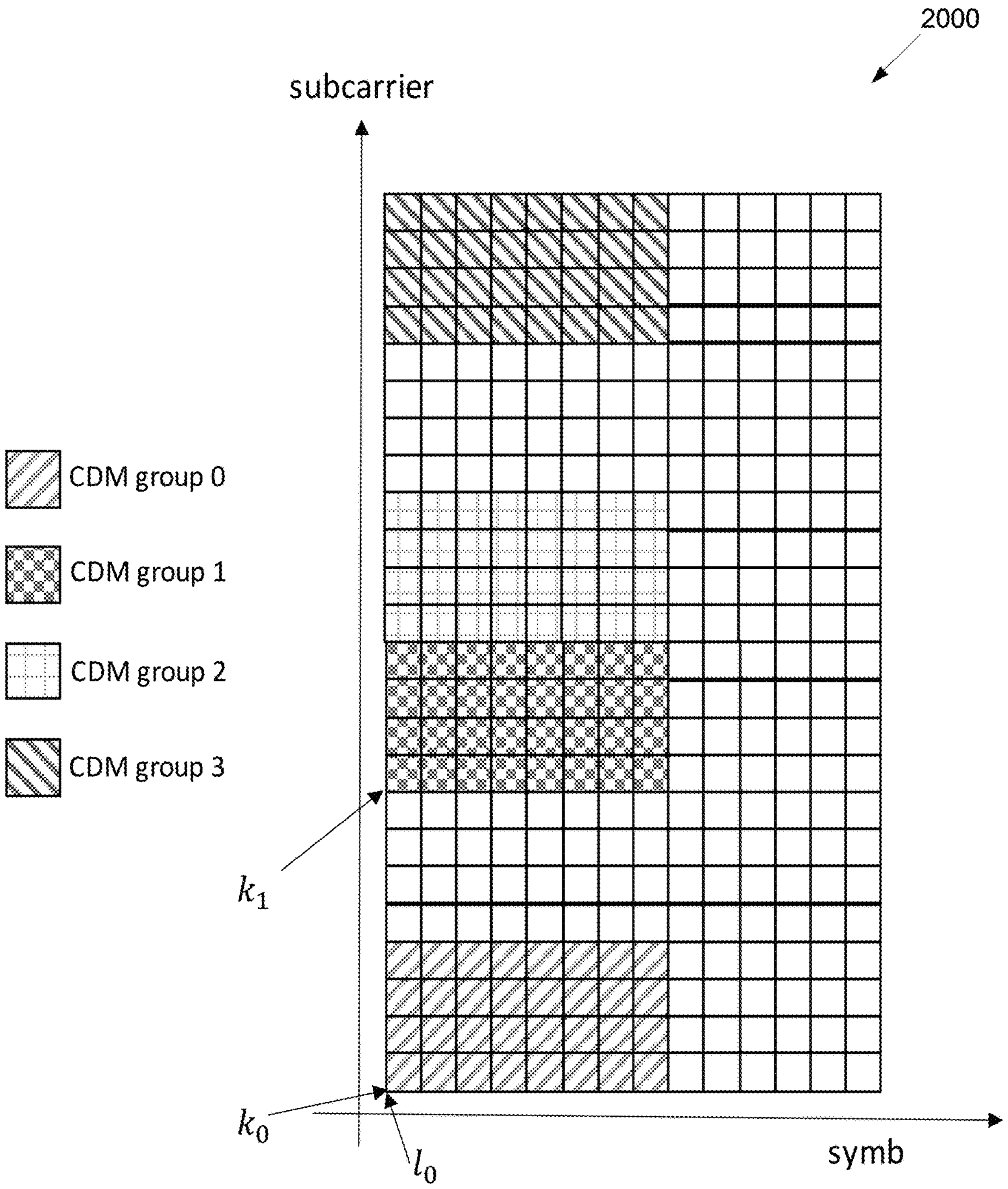

FIG. 20 illustrates an example of CSI-RS locations 2000 for row 109.

TABLE 3 lists some examples of parameter values for $$N_{SC}^{RB} = 16 \text{ and } N_{symb}^{TTI} = 14,$$

along with the corresponding RE mapping patterns depicted in FIGS. 21-25.

TABLE 3

CSI-RS Locations for $N_{SC}^{RB} = 16$, $N_{symb}^{TTI} = 14$

| Row | Ports X | Density ρ | Cluster size $N_c$ | CDM group index j, cdm-Type | $(\bar{k}_p, \bar{l}_p)$ |
|---|---|---|---|---|---|
| 200 | 128 | 1, 0.5 | 1 | (0, 1, 2, 3, 4, 5, 6, 7) → cdm16-FD4-TD4 | $(0, l_0), (4, l_0), (8, l_0), (12, l_0), (0, l_1), (4, l_1), (8, l_1), (12, l_1)$ |
| 201 | 128 | 1, 0.5 | 1 | (0, 1, 2) → cdm32-FD4-TD8; 3 → cdm32-FD8-TD4 | $(k_0, 0), (k_1, 0), (k_2, 0), (k_0, 8)$ |
| 202 | 128 | 1, 0.5 | 1 | (0, 1, 2, 3) → cdm32-FD8-TD4 | $(0, l_0), (8, l_0), (0, l_1), (8, l_1)$ |
| 203 | 128 | 1, 0.5 | 1 | (0, 1, 2, 3) → cdm32-FD4-TD8 | $(0, l_0), (4, l_0), (8, l_0), (12, l_0)$ |
| 204 | 256 | 1, 0.5 | 2 | (0, 1, 2, 3, 4, 5) → cdm32-FD4-TD8; (6, 7) → cdm32-FD8-TD4 | $(k_0, 0), (k_1, 0), (k_2, 0), (k_0 + N_{sc}^{RB}, 0), (k_1 + N_{sc}^{RB}, 0), (k_2 + N_{sc}^{RB}, 0), (k_0, 8), (k_0 + N_{sc}^{RB}, 8)$ |

Figure 21:
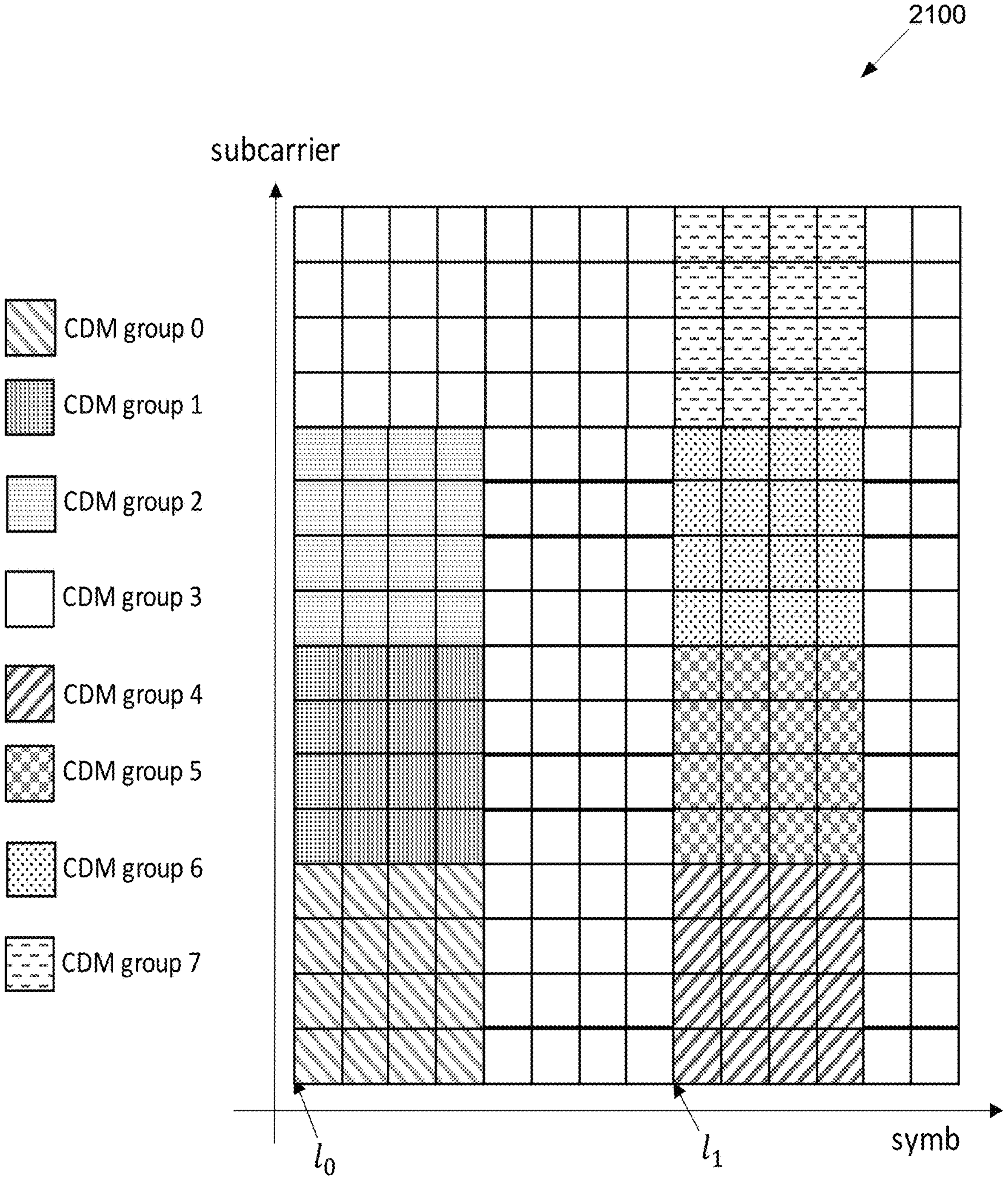

FIG. 21 illustrates an example of CSI-RS locations 2100 for row 200 in TABLE 2.

Figure 22:
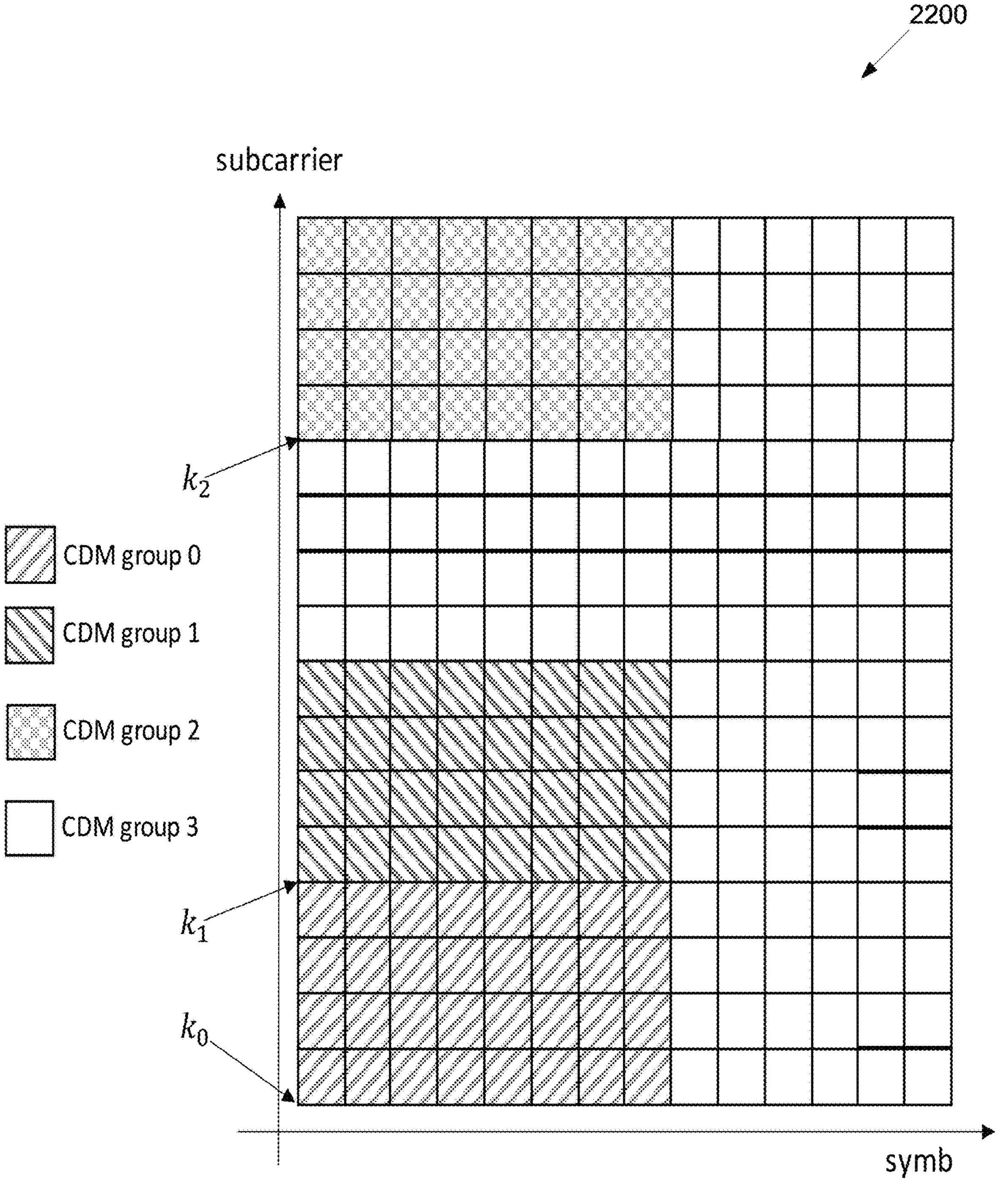

FIG. 22 illustrates an example of CSI-RS locations 2200 for row 201.

Figure 23:
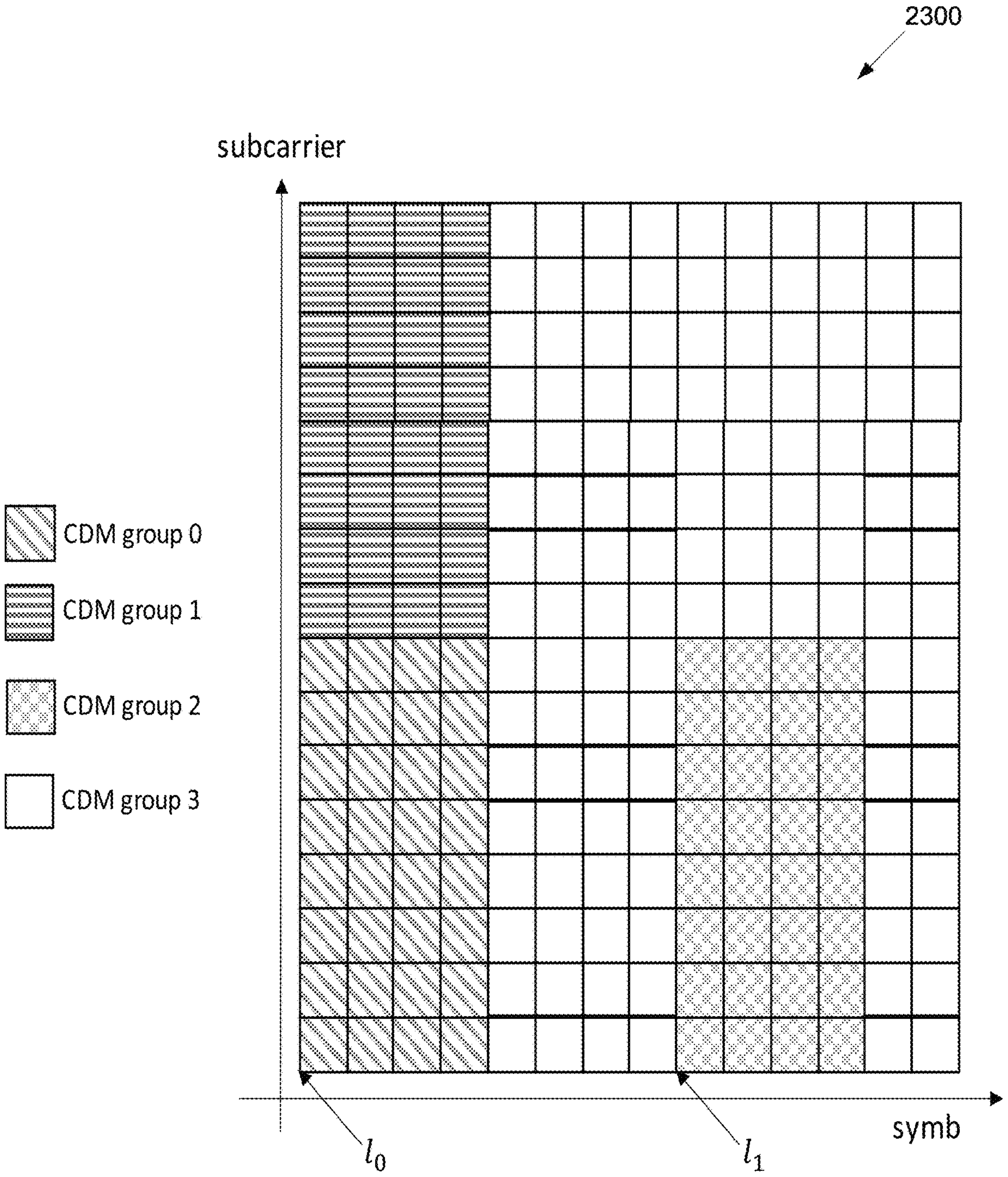

FIG. 23 illustrates an example of CSI-RS locations 2300 for row 202.

Figure 24:
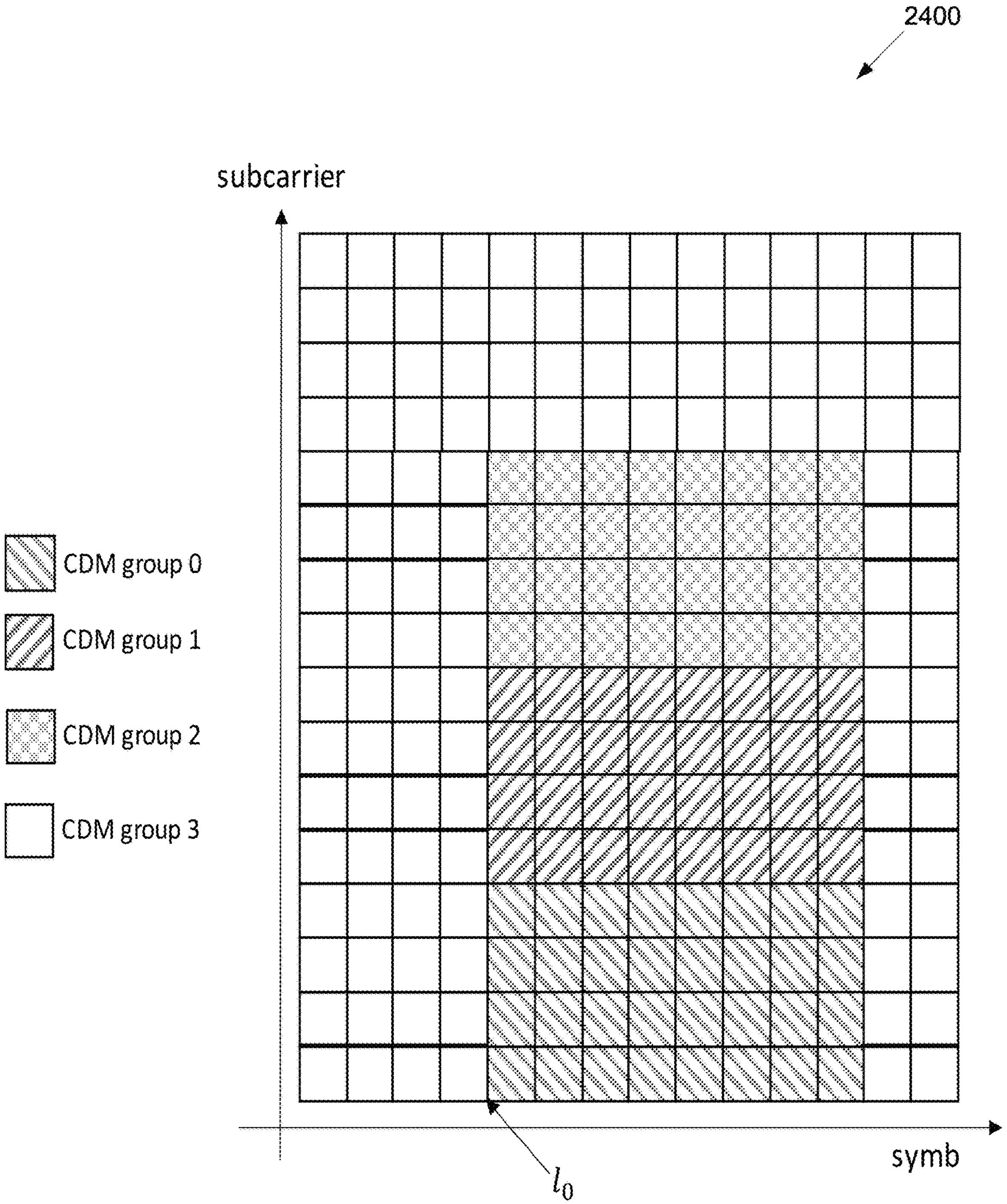

FIG. 24 illustrates an example of CSI-RS locations 2400 for row 203.

Figure 25:
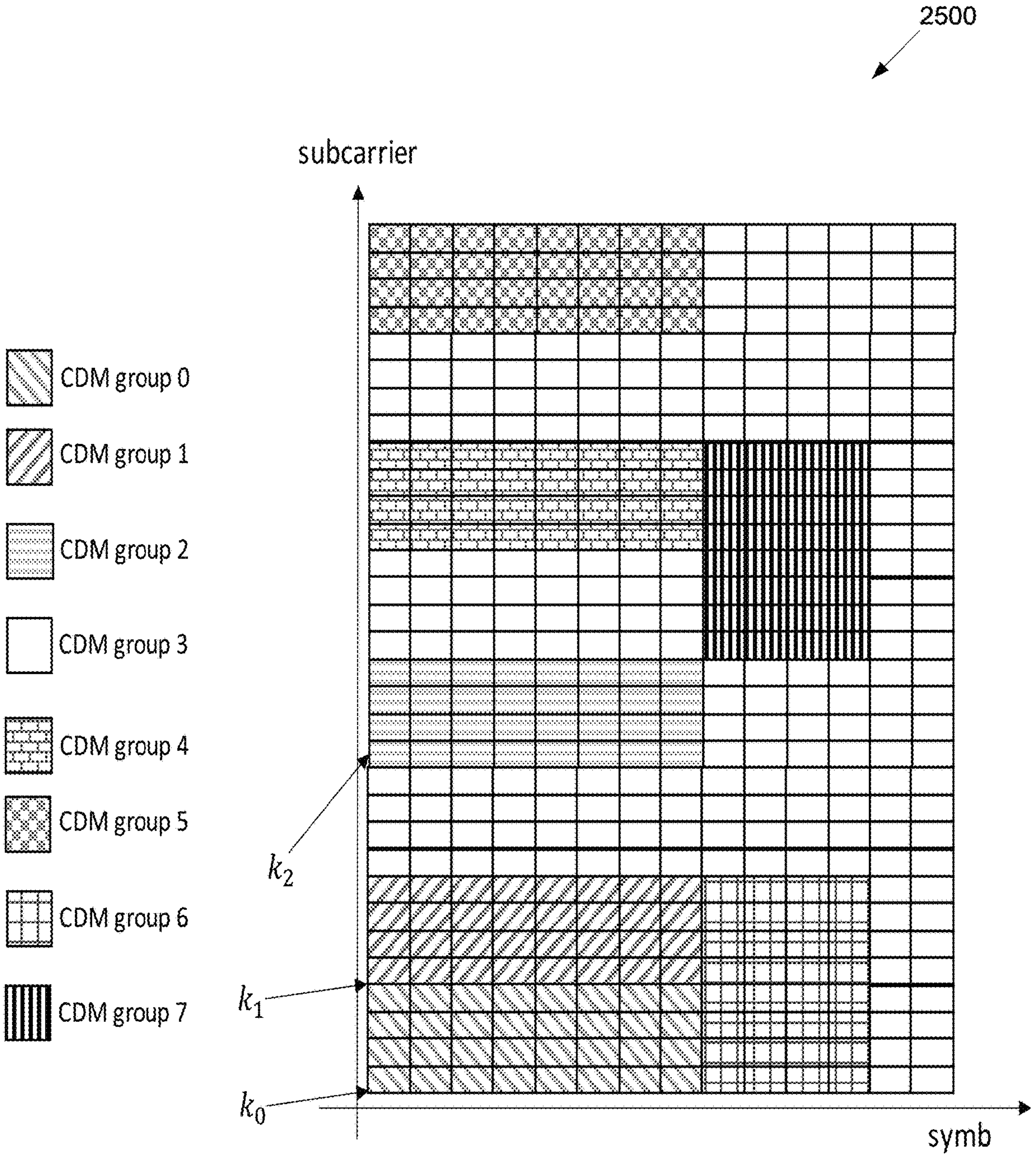

FIG. 25 illustrates an example of CSI-RS locations 2500 for row 204.

TABLE 4 lists some examples of parameter values for $$N_{SC}^{RB} = 12 \text{ and } N_{symb}^{TTI} = 16,$$

along with the corresponding RE mapping patterns depicted in FIGS. 26-30.

TABLE 4

CSI-RS Locations for $N_{SC}^{RB} = 12$, $N_{symb}^{TTI} = 16$

| Row | Ports X | Density ρ | Cluster size $N_c$ | CDM group index j, cdm-Type | $(\bar{k}_p, \bar{l}_p)$ |
|---|---|---|---|---|---|
| 300 | 128 | 1, 0.5 | 1 | (0, 1, 2, 3, 4, 5, 6, 7) → cdm16-FD4-TD4 | $(k_0, 0), (k_1, 0), (k_0, 4), (k_1, 4), (k_0, 8), (k_1, 8), (k_0, 12), (k_1, 12)$ |
| 301 | 128 | 1, 0.5 | 1 | (0, 1, 2) → cdm32-FD8-TD4; 3 → cdm32-FD4-TD8 | $(0, l_0), (0, l_1), (0, l_2), (8, l_0)$ |

TABLE 4-continued

CSI-RS Locations for $N_{SC}^{RB} = 12$, $N_{symb}^{TTI} = 16$

| Row | Ports X | Density ρ | Cluster size $N_c$ | CDM group index j, cdm-Type | $(\bar{k}_p, \bar{l}_p)$ |
|---|---|---|---|---|---|
| 302 | 128 | 1, 0.5 | 1 | (0, 1, 2, 3) → cdm32-FD4-TD8 | $(k_0, 0)$, $(k_1, 0)$, $(k_0, 8)$, $(k_1, 8)$ |
| 303 | 256 | 1, 0.5 | 2 | (0, 1, 2, 3, 4, 5, 6, 7) → cdm32-FD8-TD4 | $(k_0, 0), (k_0 + N_{sc}^{RB}, 0),$ $(k_0, 4), (k_0 + N_{sc}^{RB}, 4),$ $(k_0, 8), (k_0 + N_{sc}^{RB}, 8),$ $(k_0, 12), (k_0 + N_{sc}^{RB}, 12)$ |
| 304 | 256 | 1, 0.5 | 2 | (0, 1, 2, 3, 4, 5) → cdm32-FD8-TD4; (6, 7) → cdm32-FD4-TD8 | $(0, l_0), (N_{sc}^{RB}, l_0),$ $(0, l_1), (N_{sc}^{RB}, l_1),$ $(0, l_2), (N_{sc}^{RB}, l_2),$ $(8, l_0), (8 + N_{sc}^{RB}, l_0)$ |

Figure 26:
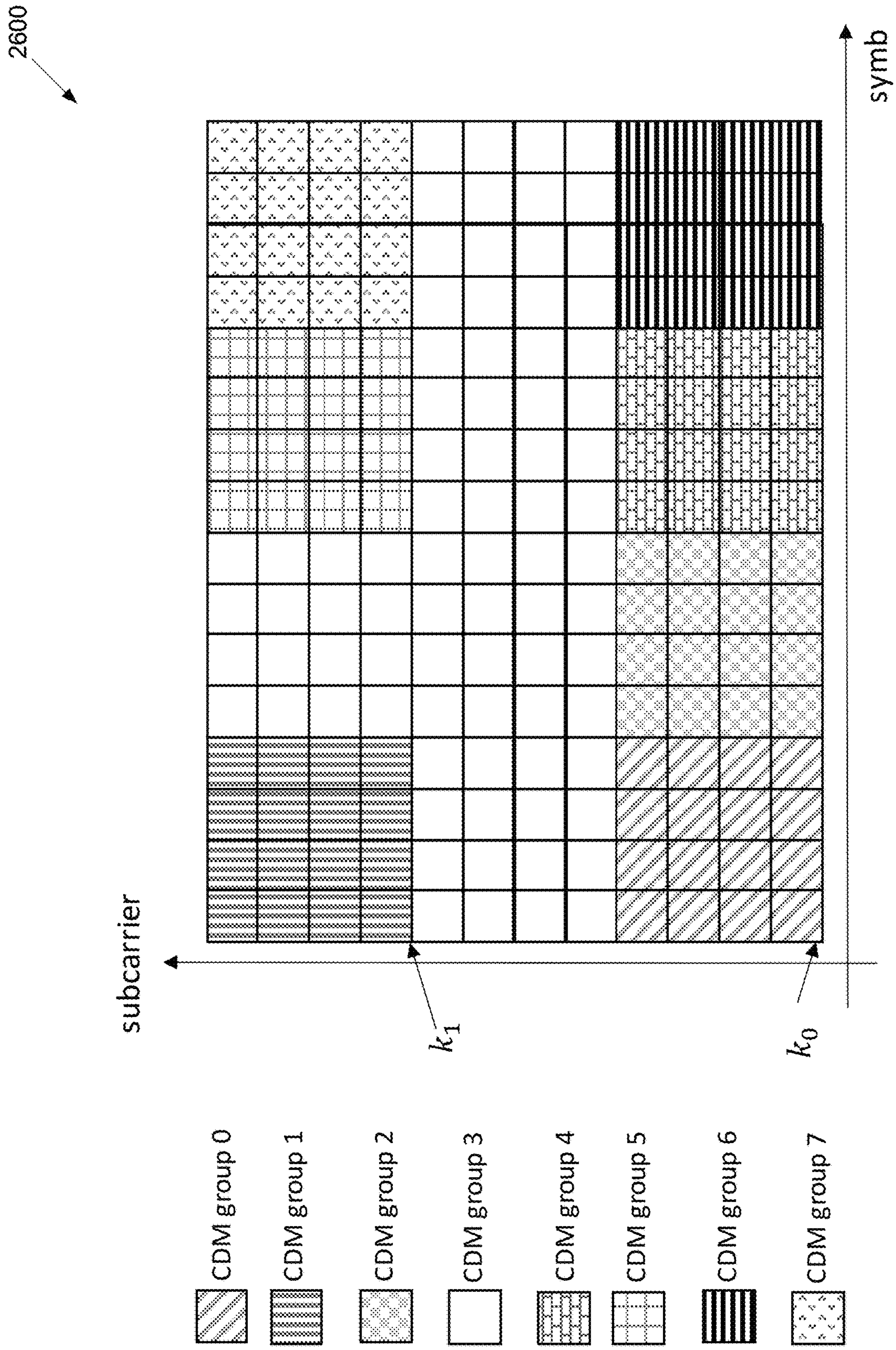

FIG. 26 illustrates an example of CSI-RS locations 2600 for row 300 in TABLE 4.

Figure 27:
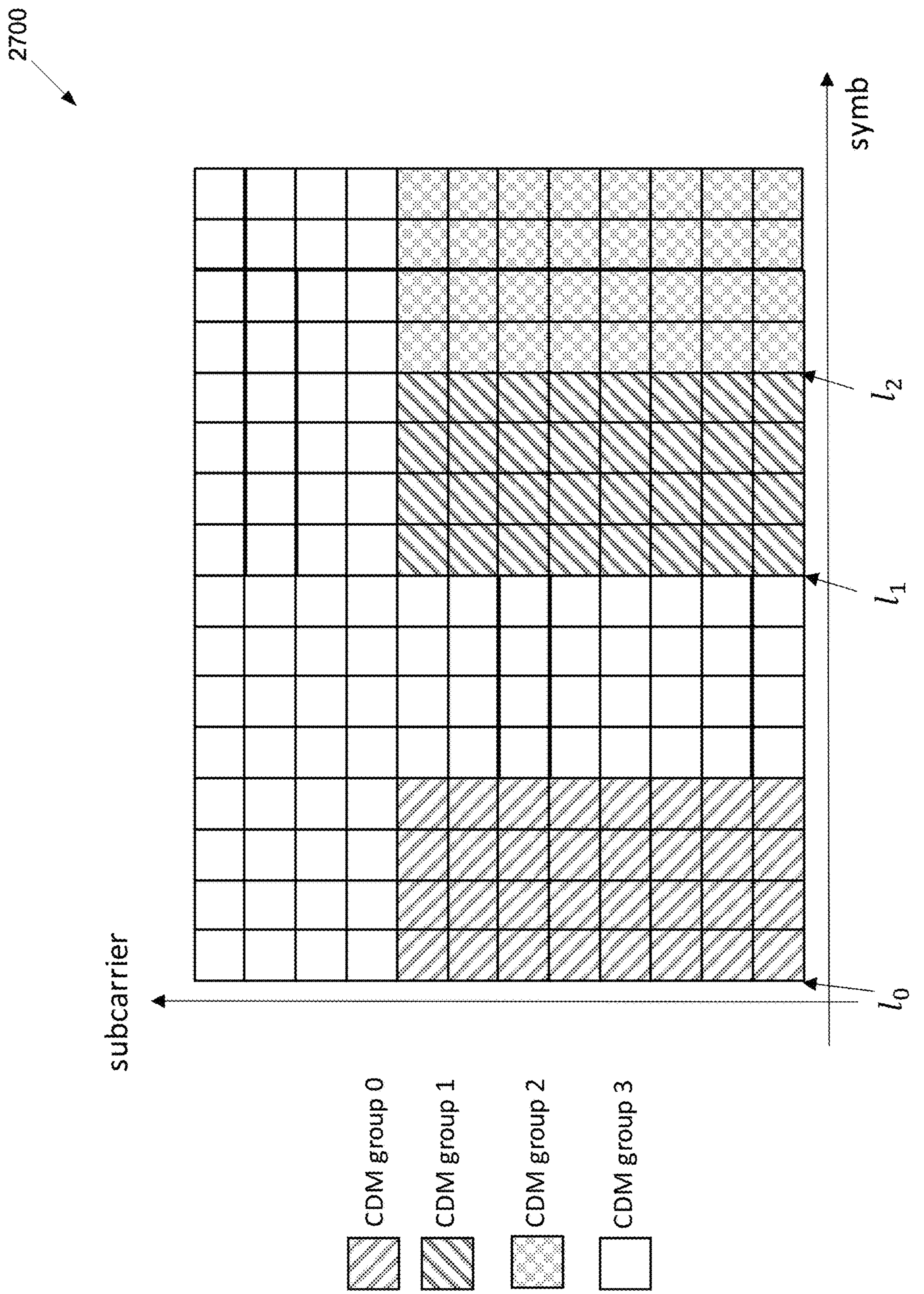

FIG. 27 illustrates an example of CSI-RS locations 2700 for row 301.

Figure 28:
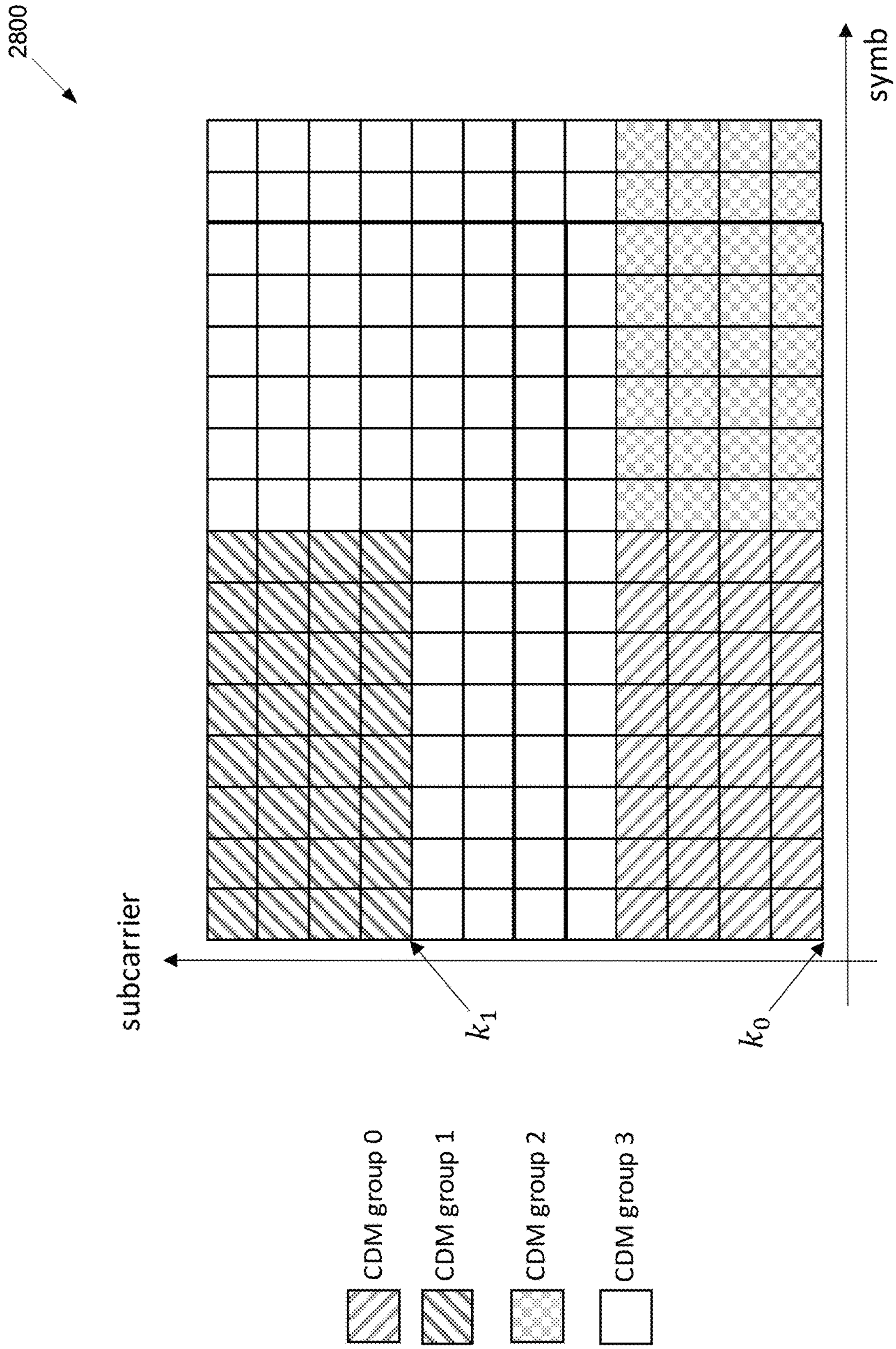

FIG. 28 illustrates an example of CSI-RS locations 2800 for row 302.

Figure 29:
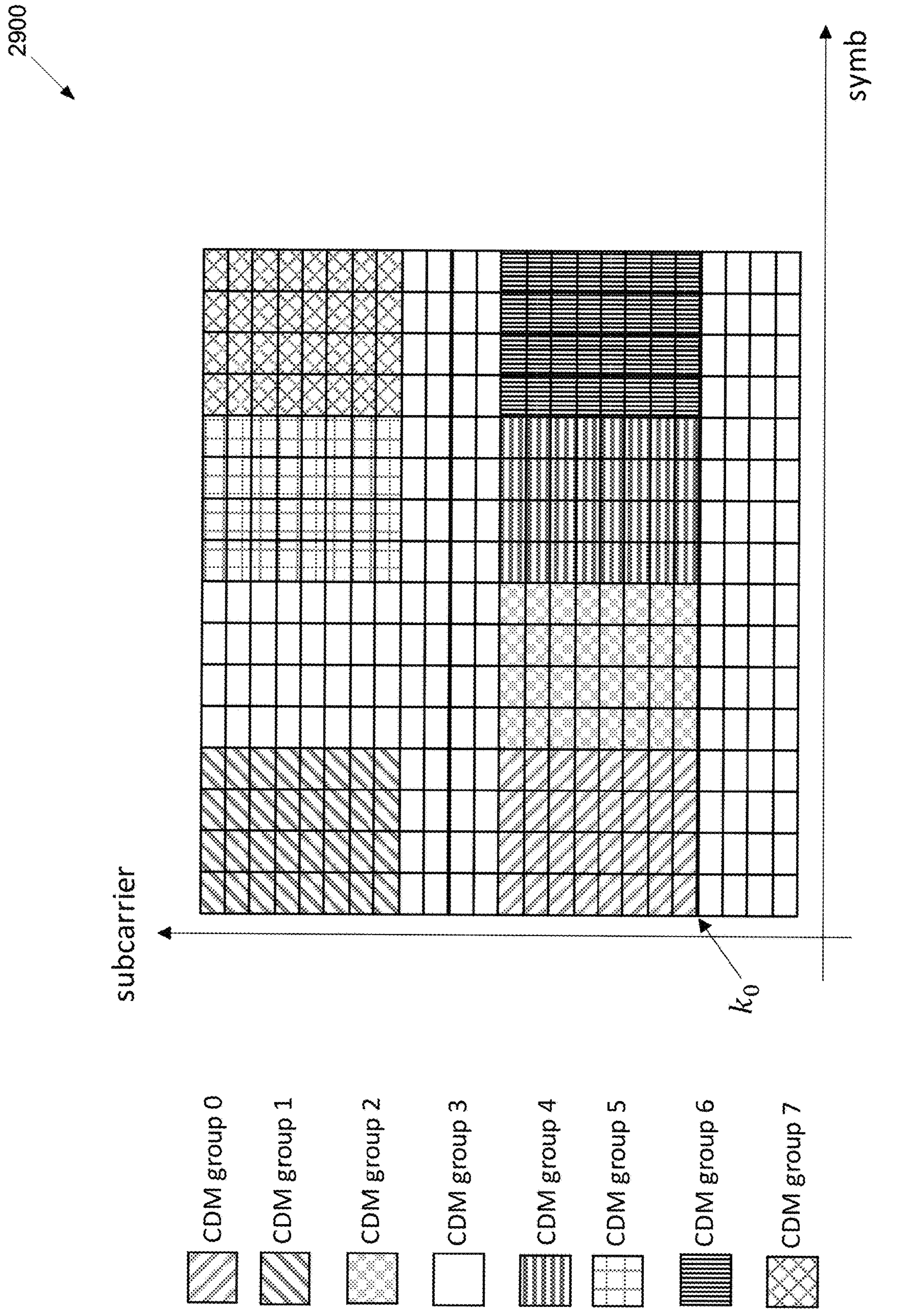
Figure 30:
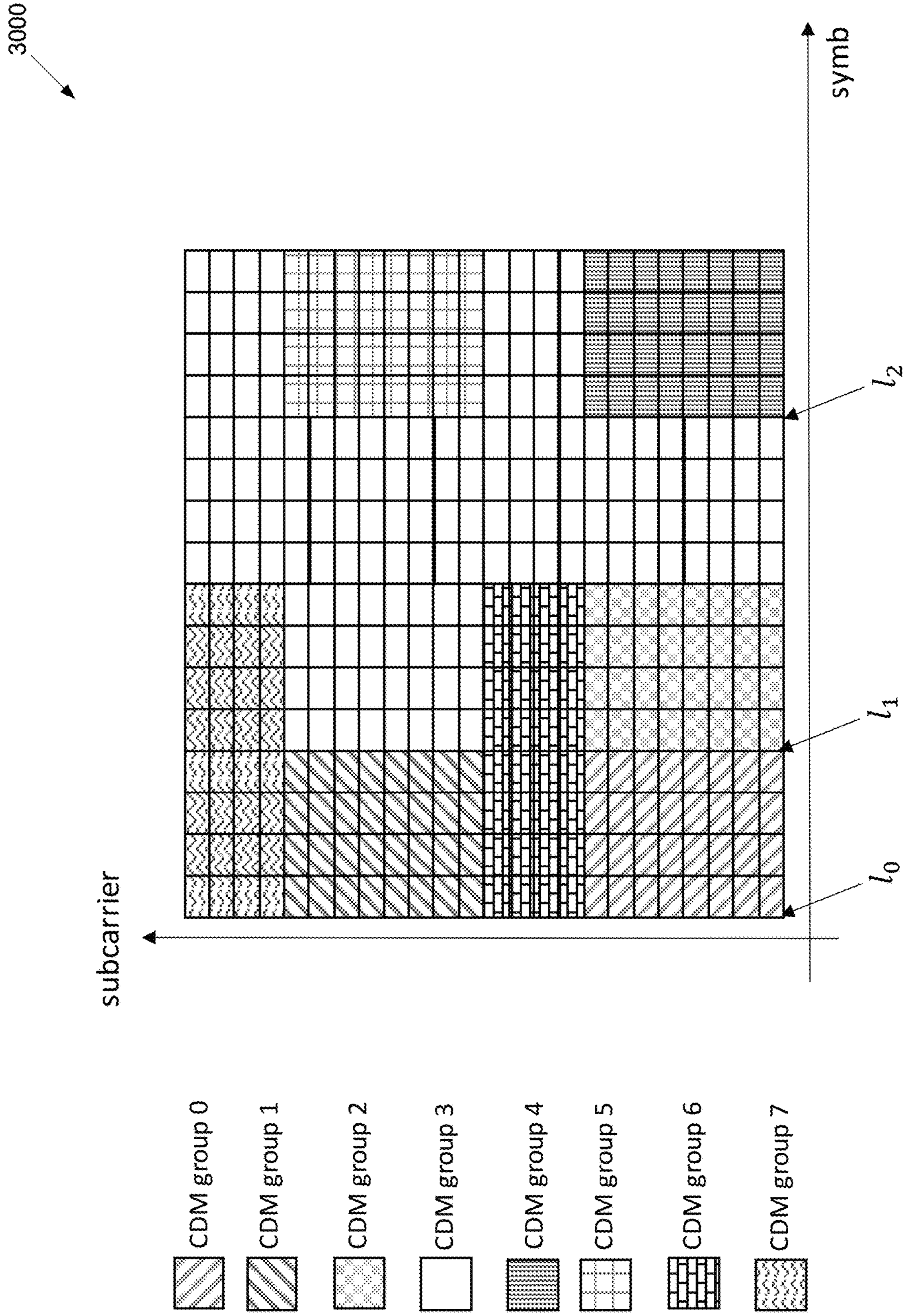

FIG. 29 illustrates an example of CSI-RS locations 2900 for row 303.

FIG. 30 illustrates an example of CSI-RS locations 3000 for row 304.

In one embodiment, a parameter indication through RRC signaling is provided. The parameters $k_0$, $k_1$, $k_2$ are indicated by a bitmap provided by the higher-layer parameter frequencyDomainAllocation in the CSI-RS-ResourceMapping IE. The bitmap is of the form $$\left[ b_{\left\lfloor \frac{N_{SC}^{RB}}{2} \right\rfloor - 1} \ \cdots \ b_0 \right].$$

For i=1,2,3, $k_{i-1}=2f(i)$, where f(i) is the bit number (counting from $b_0$) of the $i^{th}$ "1" in the bitmap. As an example, for row 201, to indicate an allocation with $k_0=0$, $k_1=4$, $k_2=12$, as depicted in FIG. 20, the frequencyDomainAllocation bitmap may be set to [0, 1, 0, 0, 0, 1, 0, 1].

The parameters $l_0$, $l_1$, $k_2$, . . . are indicated by a bitmap provided by the higher-layer parameter timeDomainAllocation in the CSI-RS-ResourceMapping IE. The bitmap is of the form $$\left[ b_{\left\lfloor \frac{N_{symb}^{TTI}}{4} \right\rfloor - 1} \ \cdots \ b_0 \right].$$

For i=1,2,3, $l_{i-1}=4f(i)$, where f(i) is the bit number (counting from 0) of the $i^{th}$ "1" in the bitmap.

The density ρ is indicated by the density parameter in the CSI-RS-ResourceMapping IE. The RB cluster size $N_c$ is indicated by the prbClusterSize parameter in the CSI-RS-ResourceMapping IE.

To allow for different CDM shapes for different CDM groups, the CSI-RS-ResourceMapping IE is enhanced to include multiple CSI-RS-cdminfo IEs, each corresponding to one CDM group. Each CSI-RS-cdmInfo IE indicates the CDM group index using the parameter cdm-GroupId and the CDM type using the parameter cdm-Type. The number of CDM groups is indicated by the parameter numCDMGroup.

In one embodiment, the UE may share its capability information. Such sharing of capability information may happen with or without request from a BS. For example, the capability information might pertain to UE's ability to handle unequal CDM sizes or UE's ability to handle different CDM shapes. Based on UE's capability information, the BS can tailor the parameters to match the capabilities of the UE so as to enable more efficient and robust communication.

In some embodiments, the UE transmits a feedback following the configurations requested by the network, including, for example, RSRP measurements and mobility state. In addition, the UE feedback may also include capability information—for example, the ability to support different-sized CDM groups. Based on the UE feedback, the network will maintain or update the requested configurations.

Based on the embodiments, a sample CSI-RS-ResourceMapping IE as illustrated in the present disclosure and a sample CSI-RS-cdmInfo IE as described in the present disclosure are constructed.

TABLE 5

| Examples of the resource mapping. |
|---|
| CSI-RS-ResourceMapping ::= SEQUENCE { |
| frequencyDomainAllocation BIT STRING$\left(\text{SIZE}\left(\left\lceil \frac{N_{SC}^{RB}}{2} \right\rceil\right)\right)$, |
| timeDomainAllocation BIT STRING$\left(\text{SIZE}\left(\left\lceil \frac{N_{symb}^{TTI}}{4} \right\rceil\right)\right)$, |
| nrofPorts ENUMERATED {p1, p2, p4, p8, p12, p16, p24, p32, p64, p128, p256}, |
| density CHOICE { |
| dot 5 ENUMERATED {evenPRBs, oddPRBs}, |
| one NULL, |
| ... |
| }, |
| prbClusterSize ENUMERATED {one, two, . . . }, |
| numCDMGroup ENUMERATED {one, two, four, eight, . . . }, |
| cdmInfo SEQUENCE (SIZE(1 .. numCDMGroup)) OF CSI-RS-cdmInfo, |
| ... |
| } |

TABLE 6

| Examples of the resource mapping. |
|---|
| CSI-RS-cdmInfo ::= SEQUENCE { |
| cdm-GroupId CSI-RS-cdm-GroupId, |
| cdm-Type ENUMERATED {noCDM, cdm4-FD2-TD2, cdm8-FD2-TD4, cdm16-FD4-TD4, cdm32-FD4-TD8, ... |
| }, |
| ... |
| } |

Figure 31:
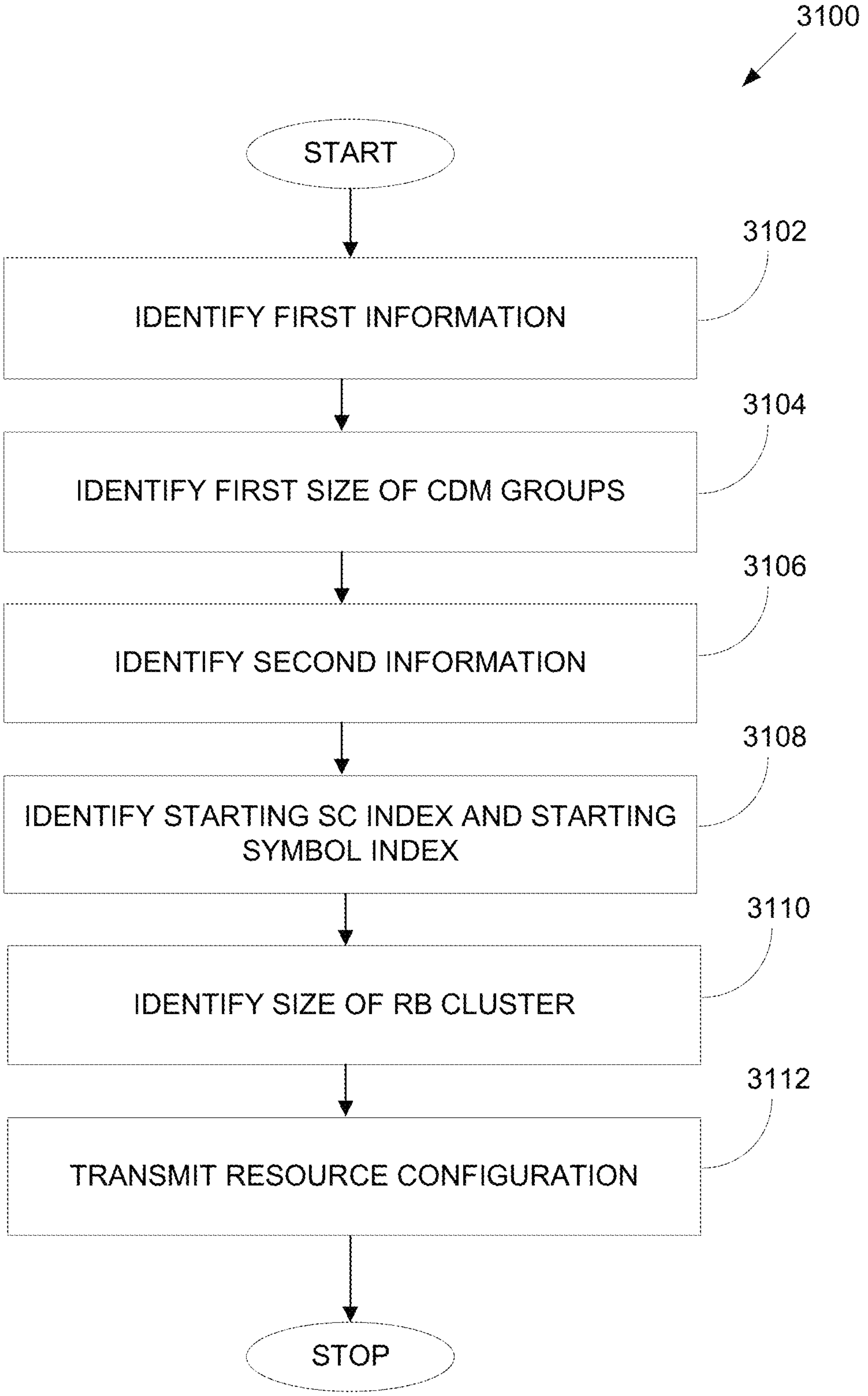
FIG. 31 illustrates a flowchart of a BS method for channel state information reference signal according to various embodiments of the present disclosure.

FIG. 31 illustrates a flowchart of a BS method 3100 for channel state information reference signal according to various embodiments of the present disclosure. A BS method 3100 as may be performed by a BS (e.g., 101-103 as illustrated in FIG. 1). An embodiment of the BS method 3100 shown in FIG. 31 is for illustration only. One or more of the components illustrated in FIG. 31 can be implemented in specialized circuitry configured to perform the noted functions or one or more of the components can be implemented by one or more processors executing instructions to perform the noted functions.

As illustrated in FIG. 31, the method 3100 begins at step 3102. In step 3102, a BS identifies first information corresponding to a number of antenna ports associated with transmissions of CSI-RSs.

In step 3104, the BS identifies, based on channel coherence information, a first size of CDM groups associated with the number of antenna ports and a first shape of the CDM groups.

In step 3106, the BS identifies, based on the first size and the first shape of the CDM groups, second information from the first information.

In step 3108, the BS identifies, based on the second information, a starting SC index and a starting symbol index for a resource allocation.

In step 3110, the BS identifies, based on the number of antenna ports associated with a CSI-RS transmission and a predetermined frequency domain granularity of channel state information, a size of RB cluster for the resource allocation.

In step 3112, the BS transmits, to a UE, resource configuration information indicating at least one of the size of RB cluster, the first size of the CDM groups, the first shape of the CDM groups, the starting SC index, and the starting symbol index.

In one embodiment, the BS identifies, based on the channel coherence information, a second size of CDM groups associated with the number of antenna ports and a second shape of the CDM groups.

In one embodiment, the BS transmits, based on the size of RB cluster, the first size of the CDM groups, the first shape of the CDM groups, the second shape of the CDM groups, the starting SC index, and the starting symbol index of the CSI-RSs.

In one embodiment, the BS receives, from the UE, feedback information including at least one of a UE mobility state, a CQI, an RSRP, and an RSRQ.

In one embodiment, the BS adjusts, based on the feedback information, the resource configuration information to be transmitted to the UE.

In one embodiment, the BS transmits, to the UE, a signal requesting the feedback information, from the UE, to adjust the resource configuration information.

In one embodiment, the BS identifies the size of the RB cluster based on the number of antenna ports and the predetermined frequency domain granularity of the channel state information.

In one embodiment, the BS receives, from the UE, UE capability information that the UE is capable of supporting a set of CDM groups each of which includes a different size or a different shape.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A base station (BS) in a wireless communication system, the BS comprising:

a processor configured to:

identify first information corresponding to a number of antenna ports associated with transmissions of channel state information-reference signals (CSI-RSs), identify, based on channel coherence information, a first size of code division multiplexing (CDM) groups associated with the number of antenna ports and a first shape of the CDM groups, identify, based on the first size and the first shape of the CDM groups, second information from the first information, identify, based on the second information, a starting subcarrier (SC) index and a starting symbol index for a resource allocation, identify, based on the number of antenna ports associated with a CSI-RS transmission and a predetermined frequency domain granularity of channel state information, a size of resource block (RB) cluster for the resource allocation; and a transceiver operably coupled to the processor, the transceiver configured to transmit, to a user equipment (UE), resource configuration information indicating at least one of the size of RB cluster, the first size of the CDM groups, the first shape of the CDM groups, the starting SC index, and the starting symbol index.

2. The BS of claim 1, wherein the processor is further configured to identify, based on the channel coherence information, a second size of CDM groups associated with the number of antenna ports and a second shape of the CDM groups.

3. The BS of claim 2, wherein the transceiver is further configured to transmit, based on the size of RB cluster, the first size of the CDM groups, the first shape of the CDM groups, the second shape of the CDM groups the starting SC index, and the starting symbol index, the CSI-RSs.

4. The BS of claim 1, wherein:

the transceiver is further configured to receive, from the UE, feedback information including at least one of a UE mobility state, a channel quality indicator (CQI), a reference signal received power (RSRP), and a reference signal received quality (RSRQ), and the processor is further configured to adjust, based on the feedback information, the resource configuration information to be transmitted to the UE.

5. The BS of claim 4, wherein the transceiver is further configured to transmit, to the UE, a signal requesting the feedback information, from the UE, to adjust the resource configuration information.

6. The BS of claim 1, wherein the processor is further configured to identify the size of the RB cluster based on the number of antenna ports and the predetermined frequency domain granularity of the channel state information.

7. The BS of claim 1, wherein the transceiver is further configured to receive, from the UE, UE capability information that the UE is capable of supporting a set of CDM groups each of which includes a different size or a different shape.

8. A method of a base station (BS) in a wireless communication system, the method comprising:

identifying first information corresponding to a number of antenna ports associated with transmissions of channel state information-reference signals (CSI-RSs);

identifying, based on channel coherence information, a first size of code division multiplexing (CDM) groups associated with the number of antenna ports and a first shape of the CDM groups;

identifying, based on the first size and the first shape of the CDM groups, second information from the first information;

identifying, based on the second information, a starting subcarrier (SC) index and a starting symbol index for a resource allocation;

identifying, based on the number of antenna ports associated with a CSI-RS transmission and a predetermined frequency domain granularity of channel state information, a size of resource block (RB) cluster for the resource allocation; and transmitting, to a user equipment (UE), resource configuration information indicating at least one of the size of RB cluster, the first size of the CDM groups, the first shape of the CDM groups, the starting SC index, and the starting symbol index.

9. The method of claim 8, further comprising identifying, based on the channel coherence information, a second size of CDM groups associated with the number of antenna ports and a second shape of the CDM groups.

10. The method of claim 9, further comprising transmitting, based on the size of RB cluster, the first size of the CDM groups, the first shape of the CDM groups, the second shape of the CDM groups the starting SC index, and the starting symbol index, the CSI-RSs.

11. The method of claim 8, further comprising:

receiving, from the UE, feedback information including at least one of a UE mobility state, a channel quality indicator (CQI), a reference signal received power (RSRP), and a reference signal received quality (RSRQ); and adjusting, based on the feedback information, the resource configuration information to be transmitted to the UE.

12. The method of claim 11, further comprising transmitting, to the UE, a signal requesting the feedback information, from the UE, to adjust the resource configuration information.

13. The method of claim 8, further comprising identifying the size of the RB cluster based on the number of antenna ports and the predetermined frequency domain granularity of the channel state information.

14. The method of claim 8, further comprising receiving, from the UE, UE capability information that the UE is capable of supporting a set of CDM groups each of which includes a different size or a different shape.

15. A user equipment (UE) in a wireless communication system, the UE comprising:

a transceiver configured to receive, from a base station (BS), resource configuration information indicating at least one of a size of resource bock (RB) cluster, a first size of code division multiplexing (CDM) groups, a first shape of the CDM groups, a starting subcarrier (SC) index, and a starting symbol index; and a processor operably coupled to the transceiver, the processor configured to:

identify the size of RB cluster for a resource allocation, the size of RB cluster is associated with a number of antenna ports for a channel state information-reference signal (CSI-RS) transmission and a predetermined frequency domain granularity of channel state information, identify the first size of CDM groups associated with the number of antenna ports and the first shape of the CDM groups, wherein the first size of CDM groups is determined in accordance with channel coherence information, and identify the starting SC index and the starting symbol index for the resource allocation, wherein:

the number of antenna ports associated with transmissions of CSI-RSs corresponds to first information and second information is identified from the first information based on the first size and the first shape of the CDM groups, and the starting SC index and the starting symbol index are determined based on the second information.

16. The UE of claim 15, wherein the processor is further configured to identify a second size of CDM groups associated with the number of antenna ports and a second shape of the CDM groups.

17. The UE of claim 16, wherein the transceiver is further configured to received, based on the size of cluster, the first size of the CDM groups, the first shape of the CDM groups, the second shape of the CDM groups the starting SC index, and the starting symbol index, the CSI-RSs.

18. The UE of claim 15, wherein:

the transceiver is further configured to transmit, to the BS, feedback information including at least one of a UE mobility state, a channel quality indicator (CQI), a reference signal received power (RSRP), and a reference signal received quality (RSRQ), and the resource configuration information to be transmitted to the UE is adjusted based on the feedback information.

19. The UE of claim 18, wherein the transceiver is further configured to receive, from the BS, a signal requesting the feedback information, from the UE, to adjust the resource configuration information.

20. The UE of claim 15, wherein:

the transceiver is further configured to transmit, to the BS, UE capability information that the UE is capable of supporting a set of CDM groups each of which includes a different size or a different shape; and the size of the cluster is identified based on the number of antenna ports and the predetermined frequency domain granularity of the channel state information.

* * * * *